United States Patent
Dixit J et al.

(10) Patent No.: US 12,237,965 B2
(45) Date of Patent: Feb. 25, 2025

(54) ASSET ERROR REMEDIATION FOR CONTINUOUS OPERATIONS IN A HETEROGENEOUS DISTRIBUTED COMPUTING ENVIRONMENT

(71) Applicant: Kyndryl, Inc., Armonk, NY (US)

(72) Inventors: Prasanna Kumar Dixit J, Bengaluru (IN); Sharat K. Tripathy, Bengaluru (IN); Mohammed Amjed Ali, Hyderabad (IN)

(73) Assignee: Kyndryl, Inc., New York, NY (US)

( * ) Notice: Subject to any disclaimer, the term of this patent is extended or adjusted under 35 U.S.C. 154(b) by 798 days.

(21) Appl. No.: 17/445,206

(22) Filed: Aug. 17, 2021

(65) Prior Publication Data

US 2023/0054912 A1 Feb. 23, 2023

(51) Int. Cl.
| | |
|---|---|
| *H04L 41/0654* | (2022.01) |
| *G06F 40/30* | (2020.01) |
| *G06V 30/148* | (2022.01) |
| *G06V 30/18* | (2022.01) |
| *H04L 67/10* | (2022.01) |

(52) U.S. Cl.
CPC .......... *H04L 41/0654* (2013.01); *G06F 40/30* (2020.01); *G06V 30/153* (2022.01); *G06V 30/18* (2022.01); *H04L 67/10* (2013.01)

(58) Field of Classification Search
CPC . H04L 41/0654; H04L 67/10; H04L 41/0677; H04L 41/16; H04L 41/22; H04L 41/5019; H04L 43/0817; G06F 40/30; G06V 30/153; G06V 30/18; G06V 30/16; G06V 30/19

USPC ........................................................ 709/224
See application file for complete search history.

(56) References Cited

U.S. PATENT DOCUMENTS

| | | | |
|---|---|---|---|
| 10,701,100 B2 | 6/2020 | Newman et al. | |
| 11,038,925 B2* | 6/2021 | Brannon | H04L 63/0227 |
| 11,481,991 B2* | 10/2022 | Tal | G06V 20/58 |

(Continued)

OTHER PUBLICATIONS

Anonymous, "System and Method to Provide Cognitive Remediation Insights for Continuous Operations in Managing an Application with Mobile and Edge Devices which Can Experience Unplanned Outages Resulting in Loss of Business," An IP.com Prior Art Database Technical Disclosure, IPCOM000264548D, Jan. 5, 2021, 11 pages.

(Continued)

*Primary Examiner* — Quang N Nguyen
*Assistant Examiner* — John Fan
(74) *Attorney, Agent, or Firm* — CANTOR COLBURN LLP; Erik Swanson

(57) ABSTRACT

Asset error remediation is provided. Risk and classification of an asset error are analyzed to prioritize asset error remediation for an asset based on risk criticality, risk context, and vulnerability level corresponding to the asset by detecting suspicious behavior and risk exposure to the asset in a heterogeneous distributed computing environment using artificial intelligence. A priority of the asset error remediation is determined to fix the asset within the heterogeneous distributed computing environment based on the risk and the classification of the asset error. A set of action steps is performed to fix the asset within the heterogeneous distributed computing environment based on the priority of the asset error remediation.

18 Claims, 16 Drawing Sheets

(56) References Cited

U.S. PATENT DOCUMENTS

| | | | | |
|---|---|---|---|---|
| 2014/0137257 | A1* | 5/2014 | Martinez | H04L 63/1433 726/25 |
| 2018/0144139 | A1* | 5/2018 | Cheng | H04L 63/1433 |
| 2019/0213511 | A1 | 7/2019 | Higgins et al. | |
| 2020/0202268 | A1 | 6/2020 | Retna et al. | |
| 2021/0374569 | A1* | 12/2021 | Jezewski | G06N 20/00 |
| 2022/0400131 | A1* | 12/2022 | Shao | G06N 3/09 |

OTHER PUBLICATIONS

Mell et al., "The NIST Definition of Cloud Computing", Computer Security Division, National Institute of Standards and Technology, Jan. 2011, 7 pages.

Khurana, "The Importance of Reverse Logistics for E-commerce," The Balance, Small Business, Apr. 8, 2019, Accessed Aug. 17, 2021, 6 pages. https://www.thebalancesmb.com/what-is-reverse-logistics-and-why-is-it-important-1141742.

Jadallah, "Use Artificial Intelligence to Improve Reverse Logistics," ASCM Insights, Blog Posts, Feb. 13, 2020, Accessed Aug. 17, 2021, 3 pages. https://www.ascm.org/ascm-insights/use-artificial-intelligence-to-improve-reverse-logistics/.

"Reverse Logistics Management for Supply Chain Cost Reductions," Logistics Bureau Pty Ltd., Jun. 21, 2016, Accessed Aug. 17, 2021, 6 pages. https://www.logisticsbureau.com/reverse-logistics-management-for-supply-chain-cost-reductions/.

Shiklo, "IoT-driven inventory management," ScienceSoft, Sep. 9, 2018, Accessed Aug. 17, 2021, 6 pages. https://www.scnsoft.com/blog/iot-for-inventory-management.

"Edge Computing: Benefits and Considerations for IoT and Beyond," White Paper, vXchnge, Copyright 2020, Accessed Aug. 17, 2021, 13 pages. https://www.vxchnge.com/hubfs/Content%20Offers/White%20Papers/Edge%20Computing%20Whitepaper.pdf.

* cited by examiner

ERROR REASON
CLASSIFICATION PROCESS
1000

FIG. 10

1002 Predefined Error Reason Codes

| | reason_code | reason_desc |
|---|---|---|
| 0 | r001 | password to reset |
| 1 | r002 | login with correct credentials |
| 2 | r003 | login failed due to password expiry |
| 3 | r004 | credentials not created |

1004 Reported Defective Asset

| Asset_id | rfid | serial_no | Asset_desc | Error_description |
|---|---|---|---|---|
| it002 | rf02 | s1292 | spss modeler | while logging in showing password expiry |

1006

| | Error_description | Predefined Error_reasons | Similarity_scores |
|---|---|---|---|
| 0 | while logging in showing password expiry | password to reset | 0.137077 |
| 1 | while logging in showing password expiry | login with correct credentials | 0 |
| 2 | while logging in showing password expiry | login failed due to password expiry | 0.23207 |
| 3 | while logging in showing password expiry | credentials not created | 0 |

Nearest Reason for the Asset Error

Error is nearest to following predefined reason:

1008

| | Error_description | Predefined Error_reason | similarity_score |
|---|---|---|---|
| 2 | while logging in showing password expiry | login failed due to password expiry | 0.23207 |

ASSET ERROR REMEDIATION FOR CONTINUOUS OPERATIONS IN A HETEROGENEOUS DISTRIBUTED COMPUTING ENVIRONMENT

BACKGROUND

1. Field

The disclosure relates generally to event management and more specifically to managing multi-cloud asset error remediation to support continuous operations management in a multi-cloud environment which can experience unplanned outages resulting in loss of business due to asset errors in the multi-cloud environment.

2. Description of the Related Art

An event is a recognized action or occurrence, often originating from an error of an external source. Events can be generated or triggered by, for example, a computer, device, application, service, or the like. One source of an event may be, for example, a hardware device, such as a sensor, malfunctioning. Typically, event driven systems are used when there is some external activity that needs to be monitored and managed. An event driven system generally runs an event loop, which keeps monitoring for such activities (e.g., an input received from a malfunctioning device). When an event occurs, the event driven system collects data regarding the event and dispatches the event to an event handler that will manage the event.

Data associated with an event at a minimum specifies where the event occurred and what type of event it is, but may include other information, such as, for example, when the event occurred, what caused the event to occur, and additional data provided by the event source. A goal of event correlation is the determination of the cause of the event. Event or error messages represent the symptoms of what is occurring.

SUMMARY

According to one illustrative embodiment, a computer-implemented method for asset error remediation is provided. A computer analyzes risk and classification of an asset error to prioritize asset error remediation for an asset based on risk criticality, risk context, and vulnerability level corresponding to the asset by detecting suspicious behavior and risk exposure to the asset in a heterogeneous distributed computing environment using artificial intelligence. The computer determines a priority of the asset error remediation to fix the asset within the heterogeneous distributed computing environment based on the risk and the classification of the asset error. The computer performs a set of action steps to fix the asset within the heterogeneous distributed computing environment based on the priority of the asset error remediation. According to other illustrative embodiments, a computer system and computer program product for asset error remediation are provided.

BRIEF DESCRIPTION OF THE DRAWINGS

FIG. 10 is a diagram illustrating an example of an error reason classification process in accordance with an illustrative embodiment;

DETAILED DESCRIPTION

Figure 1:
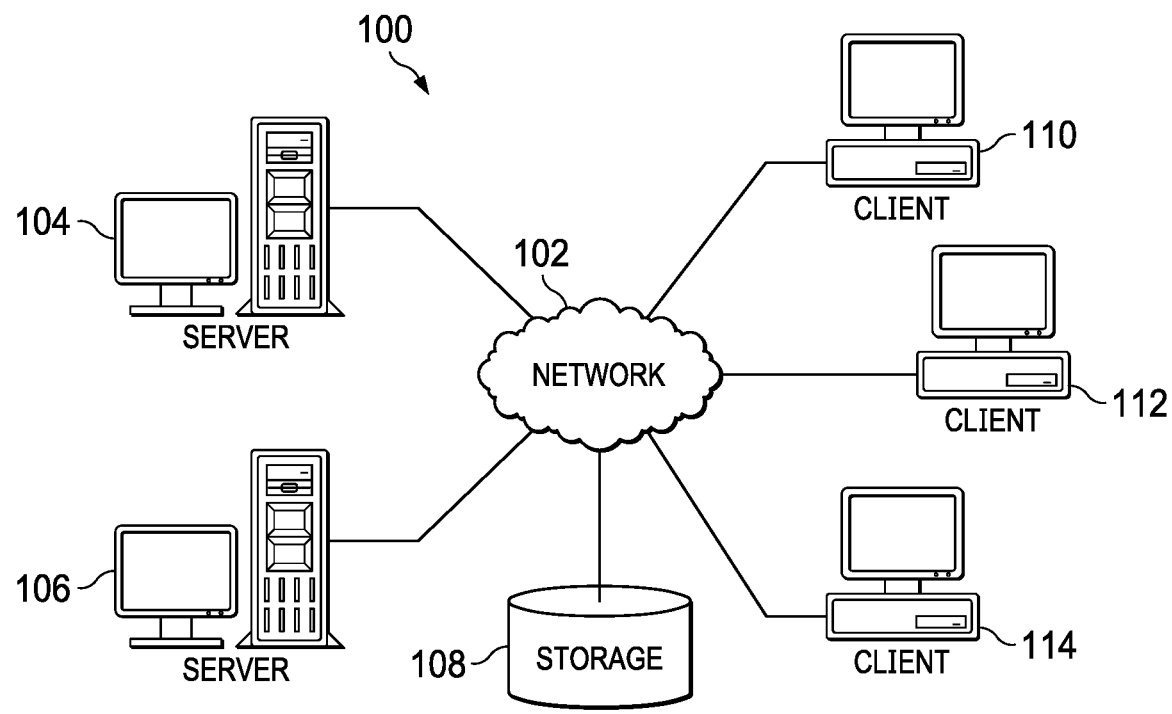
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 may be, for example, a heterogeneous distributed computing environment such as a multi-cloud environment comprised of a plurality of clouds corresponding to different cloud providers and a plurality of edge devices.

Multi-cloud is utilization of multiple cloud services, such as, for example, computing, storage, and the like, in a single heterogeneous cloud architecture. Multi-cloud also refers to distribution of assets or resources, such as, for example, computers, edge devices, sensors, applications, programs, services, and the like, across multiple cloud-hosting environments. With a typical multi-cloud infrastructure utilizing two or more clouds, such as, for example, public clouds, private clouds, hybrid clouds, or the like, a multi-cloud infrastructure tries to eliminate reliance on any single cloud provider. Multi-cloud differs from hybrid cloud in that multi-cloud refers to multiple cloud services rather than multiple cloud deployment models (e.g., public, private, and hybrid). Also, in a multi-cloud infrastructure, synchronization between different providers is not essential to complete processing or a transaction. For example, a client entity, such as, for example, an enterprise, company, business, organization, institution, agency, or the like, may concurrently use different cloud providers for infrastructure, platform, and software services. Similarly, a client entity may utilize different cloud providers for different workloads or may deploy a single workload load balanced across multiple providers.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent multiple computing nodes in one or more cloud environments. Alternatively, server 104 and server 106 may each represent a cluster of servers in one or more data centers.

In addition, server 104 and server 106 can provide asset error management services for the multi-cloud environment. For example, server 104 and server 106 can receive indications of asset errors from one or more sources, such as receiving error messages from assets, themselves, receiving asset error descriptions from users, receiving images of error messages from users as attachments, and the like. Asset errors may include, for example, malfunctioning devices, crashed applications, down services, and the like within the multi-cloud environment. Upon receiving an indication of an asset error within the multi-cloud environment, server 104 and server 106 can perform a set of action steps. The set of action steps may include, for example, automatically fixing or correcting the asset error based on predefined asset error fixing procedures, sending a notification to a user, such as, for example, a multi-cloud infrastructure administrator, regarding the asset error, providing insights into the asset error, generating a set of recommendations for manually fixing the asset error, and the like.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users, such as, for example, information technology operations administrators, multi-cloud infrastructure administrators, multi-cloud security analysts, and the like, corresponding to clients 110, 112, and 114 may utilize clients 110, 112, and 114 to access and utilize the multi-cloud asset error management services provided by server 104 and server 106.

Storage 108 is a network storage device capable of storing any type of data in a structured format or an unstructured format. In addition, storage 108 may represent a plurality of network storage devices. Further, storage 108 may store cloud identifiers, identifiers and network addresses for a plurality of servers, identifiers and network addresses for a plurality of edge devices, identifiers and network addresses for a plurality of client devices, identifiers for a plurality of users, asset error messages, asset error message images, asset error descriptions, original asset images, defective asset images, lists of defective assets, predefined reasons for asset errors, predefined key phases corresponding to asset error descriptions, predefined asset error fixing procedures provided by asset manufacturers, and the like. Furthermore, storage 108 may store other types of data, such as, for example, authentication or credential data that may include usernames, passwords, and the like associated with multi-cloud administrators and users.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
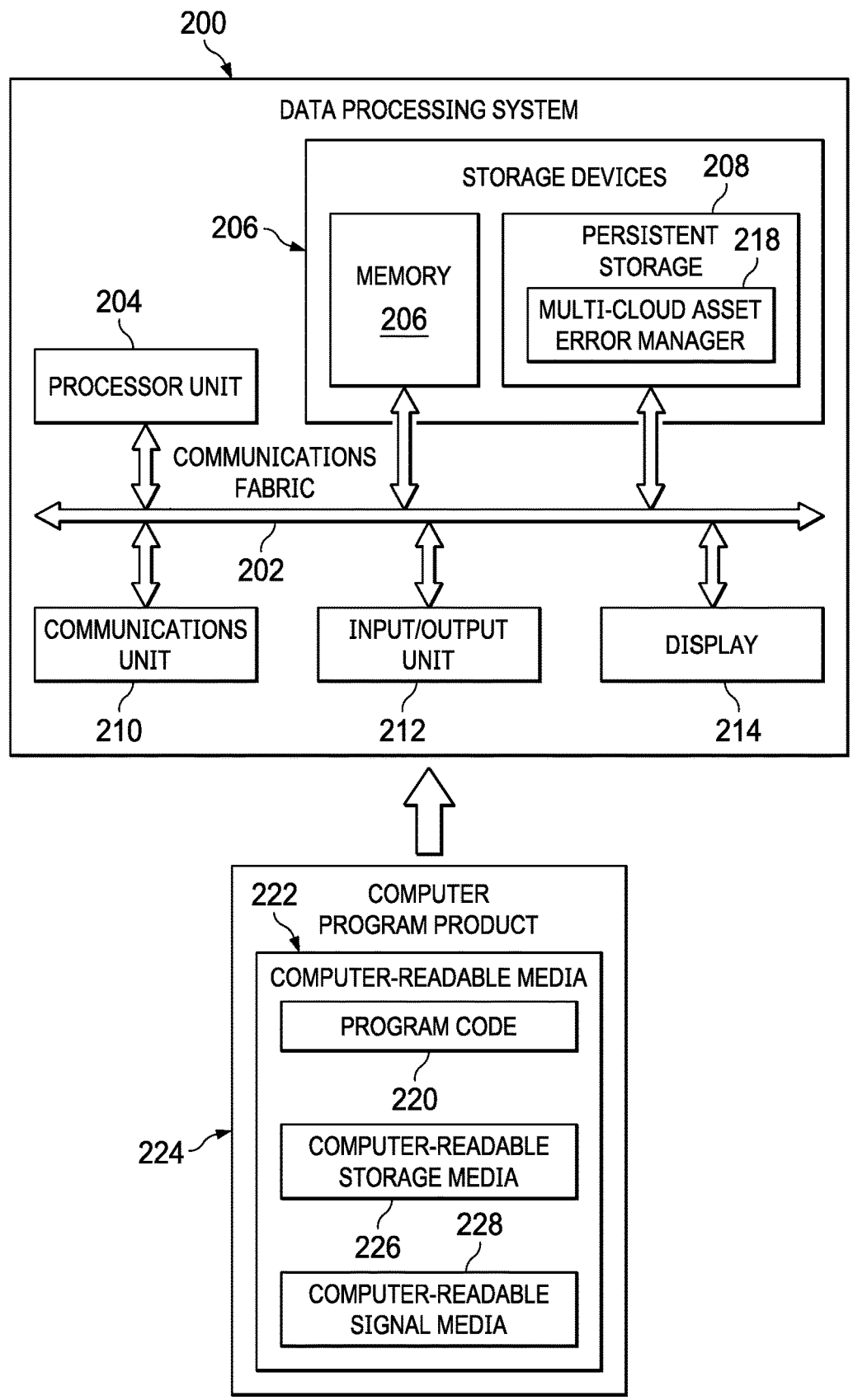
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the asset error management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores multi-cloud asset error manager 218. However, it should be noted that even though multi-cloud asset error manager 218 is illustrated as residing in persistent storage 208, in an alternative illustrative embodiment, multi-cloud asset error manager 218 may be a separate component of data processing system 200. For example, multi-cloud asset error manager 218 may be a hardware component coupled to communication fabric 202 or a combination of hardware and software components. In another alternative illustrative embodiment, a first set of components of multi-cloud asset error manager 218 may be located in data processing system 200 and a second set of components of multi-cloud asset error manager 218 may be located in a second data processing system, such as, for example, server 106 in FIG. 1.

Multi-cloud asset error manager 218 controls the process of managing multi-cloud asset error remediation to support continuous operations management in a multi-cloud environment. The multi-cloud environment may be, for example, network data processing system 100 in FIG. 1. Multi-cloud asset error manager 218 monitors for a set of error indicators corresponding to an asset that has a defect or has malfunctioned within the multi-cloud environment from one or more sources. The set of error indicators may include, for example, at least one of an error message, an error message image, an error description, and the like. The one or more sources of the error indicators may include the asset, itself, and/or a user. Upon receiving the set of error indicators corresponding to the defective asset within the multi-cloud environment, multi-cloud asset error manager 218 automatically performs a set of action steps to fix the defective asset.

As a result, data processing system 200 operates as a special purpose computer system in which multi-cloud asset error manager 218 in data processing system 200 enables management of asset error remediation in a multi-cloud environment. In particular, multi-cloud asset error manager 218 transforms data processing system 200 into a special purpose computer system as compared to currently available general computer systems that do not have multi-cloud asset error manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
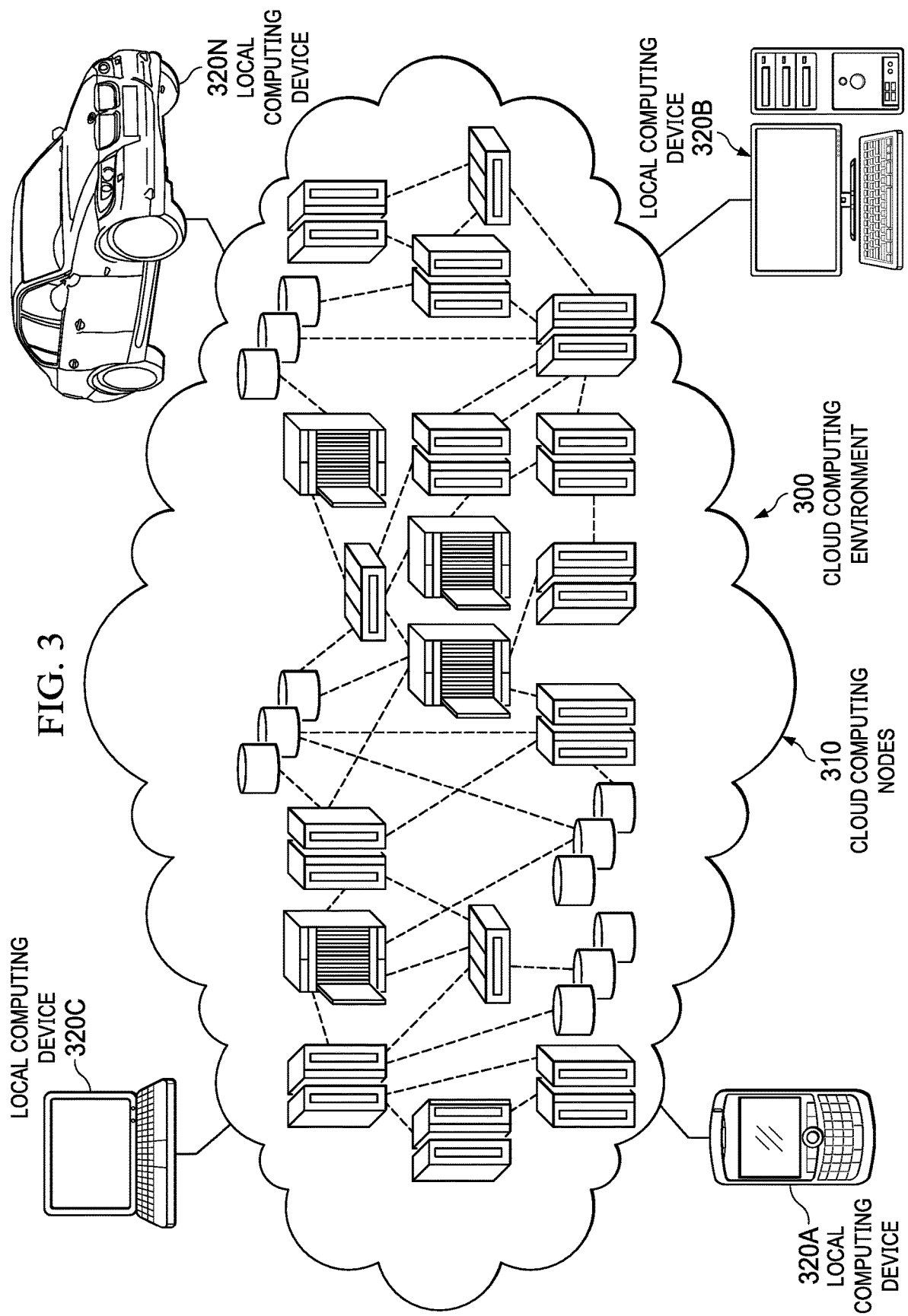
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
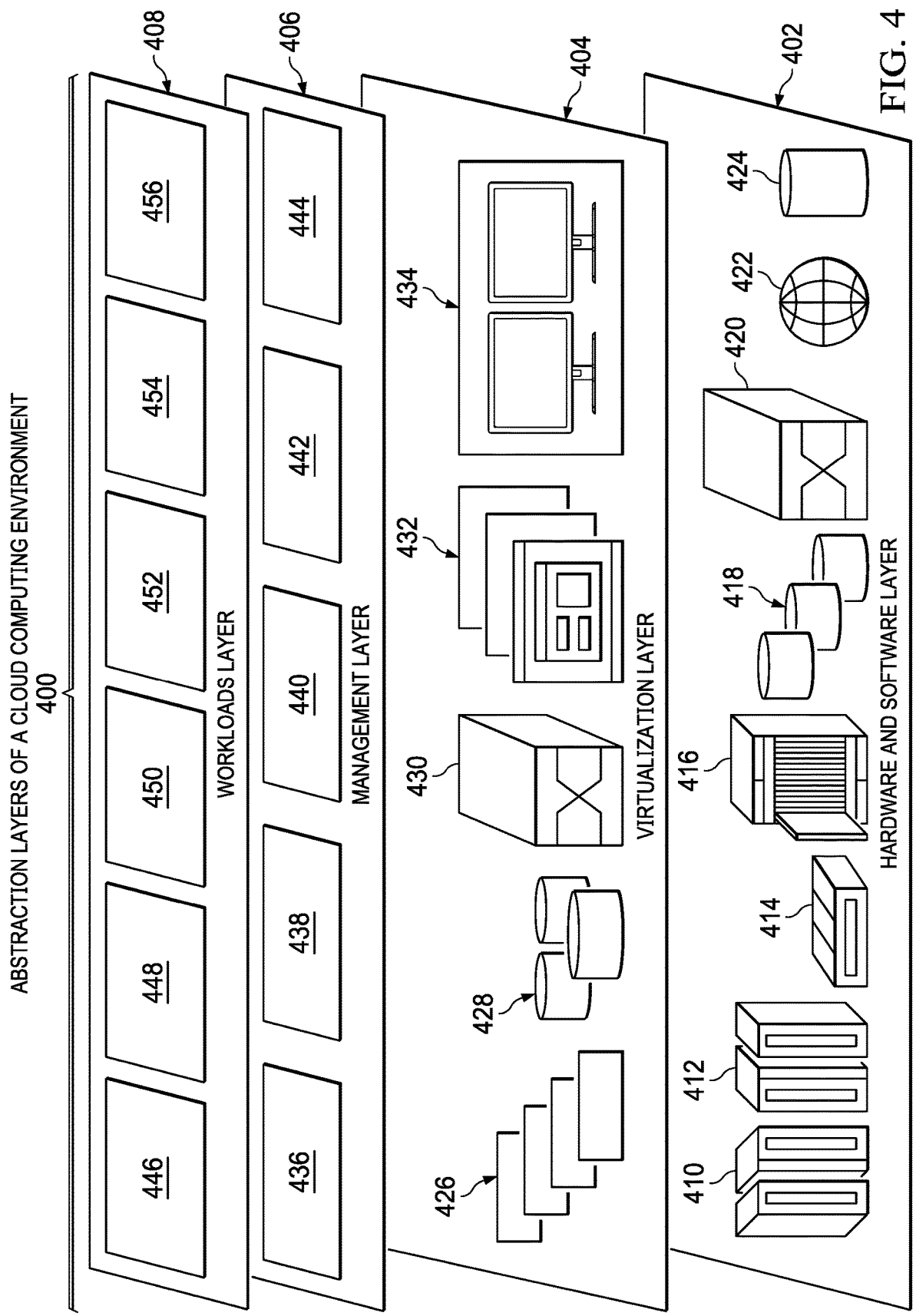
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and multi-cloud asset error management 456.

Currently, gathering quality error resolution information and a multi-cloud asset inventory health report for implementing countermeasures for malfunctioning cloud inventory assets, such as, for example, container images, virtual machines, physical devices, storage buckets, databases, access control lists, elastic load balancers, and the like, across all regions and accounts, which can complement enterprise polices on security governance, asset risk, and regulatory compliance to ensure audit readiness, is taking hours to days with a low confidence level in data consistency due to massive scale, variability, and rate of change. Manually addressing this without the appropriate tools produces inconsistent results and an unwieldy task that can be error prone.

Building a cognitive multi-cloud business involves autonomous management and control of adaptability and programmability of assets (e.g., physical devices, services, and the like) having attributes of decentralized trust, traceability, transparency, privacy, and security operations. Analyzing asset risk affinity using remote security diagnostics and prescriptive maintenance support provided by a remediation tool will help to address business challenges, such as, for example, multi-cloud infrastructure cost reduction. Currently, no single error remediation tool exists that can provide, for example, an insight to security posture and risks, manage regulatory compliance consistently across multiple cloud environments, provide a single pane view to manage risk and compliance with prescriptive controls, provide vulnerability detection and remediation across different cloud service providers in real time or near real time, and the like.

Existing approaches to address these issues have limitations. For example, current managed service providers depend on the original equipment manufacturer providers/partners in an open-source domain and are challenged with having proprietary technology stacks and clients having to use only specific services (e.g., provider lock-in). In addition, scalability of containers is yet to be tested. Further, providing integrated managed services is complex when more than one cloud service provider is in a client environment.

Event management is needed to condense the information from a large number of network, system, and application events to a smaller, more meaningful set of actionable remediation recommendations that can be handled by the system or subject matter expert in a timely manner. Monitoring large numbers of host nodes and distributed cloud networks require algorithms to preprocess all of the collected event information from assets, such as, for example, mobile devices, edge Internet of Things (IoT) devices/sensors, machine to machine (M2M) technology, and the like, and aggregate actionable remediation insights to be visualized, for example, by a subject matter expert at a mission control center. An event indicates that something has happened to an asset, such as, for example, a device, application, service, or any other type of monitored asset.

Illustrative embodiments assign severity levels to events. Illustrative embodiments utilize the severity levels to rank importance of a particular event. Illustrative embodiments base the severity level on information received from the event source. Illustrative embodiments set priority for an event based on the severity level of the event. For example, if an event has a critical severity level, then illustrative embodiments set a highest priority of 1 for that event; if the event has a high severity level, then illustrative embodiments set a second highest priority of 2 for that event; if the event has a medium severity level, then illustrative embodiments set a priority of 3 for that event; and if the event has a low severity level, then illustrative embodiments set a lowest priority of 4 for that event. Illustrative embodiments correlate events into an incident based on matching event attributes. Event attributes may include, for example, cluster, application, host name, internet protocol address, controller node, resource identifier, service, resource name, and the like.

Illustrative embodiments utilize artificial intelligence to optimize multi-cloud operations, which includes contingency planning. Autonomous capabilities can include many types and operate across different computing environments with varying levels of capability, coordination, and intelligence. Illustrative embodiments limit the capability of centralized operations for managing large scale deployment of a multi-cloud network in a distributed environment, such as, for example, mobile devices, IoT devices/sensor, M2M (machines/robotics), and the like, with remote management capability to drive efficiency inside out across a high priority industry segment consuming 5G services. An aspect of illustrative embodiments is to maintain application throughput and availability and decrease latency within the multi-cloud network.

Illustrative embodiments utilize a multi-step workflow to achieve optimized multi-cloud operations. For example, as a first step, illustrative embodiments can perform automated discovery of each asset (e.g., mobile device, IOT device, smart vehicle, and the like) across the multi-cloud environment that is scalable on demand. As a second step, illustrative embodiments can continuously assess asset visibility (e.g., perform health checks) to validate that each respective asset is operational to manage security governance and regulatory compliance of the managed multi-cloud environment with implemented controls to decrease risk exposure. As a third step, illustrative embodiments can analyze risk modeling and asset error classification to prioritize error remediation based on asset risk criticality, risk context, and level of vulnerability to provide security insights by detecting and analyzing suspicious behavior and risk exposure to assets, such as, for example, applications and infrastructure, of the multi-cloud environment. As a fourth step, illustrative embodiments can prioritize which asset is to be fixed or repaired first based on the risk exposure using error remediation insights. As a fifth step, illustrative embodiments can perform benchmarking and asset availability analysis during risk exposure as compared to other peer clients to provide audit preparedness to demonstrate security governance (e.g., risk and regulatory compliance status of the managed multi-cloud environment hosting the applications on the infrastructure). Then, illustrative embodiments return to the first step where illustrative embodiments continue asset discovery across the multi-cloud environment.

Illustrative embodiments utilize a plurality of algorithms that are interdependent. For example, illustrative embodiments can daisy chain the algorithms such that an output of one algorithm is an input to a next algorithm in the chain. One algorithm is an object extractor and image interpreter algorithm, which utilizes computer vision techniques. The object extractor and image interpreter algorithm receives an image of an error message as input. The object extractor and image interpreter algorithm may receive the image of the error message as, for example, an attachment to an email. The object extractor and image interpreter algorithm segments the image of the error message to identify a relevant text portion corresponding to the error as would be done by human analyst. The object extractor and image interpreter algorithm ignores the remaining portions of the image, such as logos, symbols, graphics, and the like, which are not relevant to the error analysis. The object extractor and image interpreter algorithm extracts the identified relevant text portion corresponding to the asset error from image. The object extractor and image interpreter algorithm utilizes the extracted relevant text portion corresponding to the asset error as input for classification of the reason for the asset error.

A second algorithm is a reason for error classification to nearest neighbor algorithm. The reason for error classification to nearest neighbor algorithm receives a description of the error as provided by a user in a free text format in the user's own words as input. The reason for error classification to nearest neighbor algorithm utilizes, for example, natural language processing to read and process the description of the asset error in the free text format. The reason for error classification to nearest neighbor algorithm calculates a similarity score between each predefined reason for error and the description of the asset error. It should be noted that illustrative embodiments maintain a list or database of predefined reasons for errors. The reason for error classification to nearest neighbor algorithm identifies a nearest predefined reason for error neighbor based on its corresponding similarity score being the highest similarity score. However, it should be noted that a human analysis can differ due to semantics extraction as done by a human brain. In addition, the reason for error classification to nearest neighbor algorithm identifies an error reason code corresponding to the identified nearest predefined reason for error neighbor.

Illustrative embodiment input the extracted relevant text portion corresponding to the asset error from the error message image and the error reason code corresponding to the identified nearest predefined reason for error neighbor into the next algorithm in the chain (i.e., an auto-fix recommendation algorithm). The auto-fix recommendation algorithm utilizes natural language processing to read and process the extracted relevant text portion corresponding to the asset error from the error message image and the error description provided by the user to generate an error characteristic matrix consisting of a set of error key phrases in a vector format that encompasses the meanings of the error message and the error description. It should be noted that illustrative embodiments maintain a list or database of predefined error key phrases. The auto-fix recommendation algorithm utilizes natural language processing to overcome challenges, such as, for example, interpretation of free form error description provided by the user (e.g., the same error can be described using different words by different users (lemmatization) and user perception of the error can be different from the actual reason for the error). The auto-fix recommendation algorithm moderates user preconception by using the predefined error key phrases.

Further, the auto-fix recommendation algorithm, using predefined error recommendation procedures provided by asset manufacturers, identifies a set of fixes for the asset error in a vector format. A fix provides what procedure to follow to correct the asset error. It should be noted that a fix can address a number of similar asset errors.

The auto-fix recommendation algorithm calculates a similarity score between each respective error key phrase in the set of error key phrases and each respective fix in the set of fixes. The auto-fix recommendation algorithm identifies the fix having the highest similarity score. Alternatively, the auto-fix recommendation algorithm may identify the top predefined number of fixes having the highest scores. However, it should be noted that human analysis can differ due to semantics extraction as done by a human brain.

Moreover, illustrative embodiments also utilize a localize defect in asset image algorithm. Currently, field inspection of defective assets (e.g., devices, container images, services, and the like) is done remotely to get alerts detecting tasks or situations that need attention, such as, for example, container images with vulnerabilities, digital certificates that have expired or will expire soon, suspicious network traffic, suspicious activity patterns, or any other additional findings that may be required for security governance and risk mitigation to maintain regulatory compliance. Using image processing techniques to localize a set of defects in an asset enables illustrative embodiments to prioritize risk from malicious actors, suspicious network activity, or the like.

Furthermore, illustrative embodiments can subscribe to partner computing environments or eco-systems and assess potential malfunction behavior of an asset, such as, for example, an application, to obtain insight into estimated degraded performance of the asset with regard to service level agreement. Illustrative embodiments can also receive a notification of potential health-fix advisory from a given asset vendor to perform assessment of asset behavior pattern with reference to fix affinity and apply the context-based auto-fix recommendation for sustainable continuous multi-cloud operations, which includes built-in contingency planning. In addition, illustrative embodiments can perform a daily operational readiness test powered by a contextual optimization workflow with prescribed diagnostics to estimate asset (e.g., application) problem severity and associated fix affinity.

Illustrative embodiments also assess severity of an asset defect based on the level of risk. Illustrative embodiments can classify the level of risk as, for example, critical, high, medium, or low. Illustrative embodiments utilize this information for decision making by managing evidence related to vulnerabilities regarding potential risk and audit exposure as non-compliance in overall security governance, which can lead to a negative impact on business and brand image and to monetary penalties. Thus, illustrative embodiments can save cost and time of field force engagement and travel. In addition, illustrative embodiments can provide insights on ageing assets.

The application of natural language processing and natural language generation in multi-cloud service optimization by illustrative embodiments can range from simple process automation to something as complex as generating asset error remediation recommendations based on system and service management data (e.g., incident, problem, and change data). Illustrative embodiments apply natural language processing and natural language generation to business cases with a deep understanding of information technology service markets and their operations.

Illustrative embodiments read aggregated data sets and convert the aggregated data sets into natural language recommendations. Illustrative embodiments can provide recommendations on how to balance technology and human intervention whether automating performance of certain tasks to obtain consistent outcomes or extracting key natural language data elements from service management data, health check data, vulnerability management data, and compliance management data for analysis. The systematic automation method of illustrative embodiments can optimize cost, build efficiency, and increase productivity consistently, which can lead to higher client satisfaction, profit margins, accuracy, and more standardized omni-channel operations.

Illustrative embodiments analyze the data provided by the different algorithms and provide a response to the event that occurred (e.g., asset error). Illustrative embodiments generate a best fix procedure for the asset error. Furthermore, illustrative embodiments can generate patterns to be embedded in devices. A pattern is regularity of predictable behavior of an outcome with multiple combinations that can be programmed and integrated in devices to orchestrate and aggregate the devices to a system management console if needed.

As an illustrative example, a Day One scenario is defined as a vulnerability, which is a result of an unauthorized access due to out-of-date patching of an unsecure container image, administering unsecure application logic, bad configuration, or the like. Illustrative embodiments enable a Day Zero scenario by performing proactive assessment of potential risk on sensitive data, how an application is utilized in a business environment, and the like. As a result, the business will become resilient to any risk exposure corresponding to regulatory compliance requirements for not having a response to mitigate the risk caused by, for example, container images with vulnerabilities, expired certificates, suspicious network traffic, suspicious activity patterns, or any other additional findings that may be required for security governance and risk mitigation to maintain a regulatory compliance.

By proactively implementing asset error remediation procedures by running remote diagnostics and acting on predictive maintenance, illustrative embodiments can determine, for example, how many managed multi-cloud service provider infrastructure assets are affected by an error, what cross infrastructure components are affected beyond the multi-cloud environment, how to obtain the fix for the asset error from the open-source community, how to enforce continuous cloud inventory asset accuracy and exhaustivity, how to integrate threat modelling to be risk aware for security governance and regulatory compliance, and the like. Illustrative embodiments can provide all of this information in a single pane of glass view for multi-cloud operations.

The single pane of glass view is, for example, a digital dashboard management console that presents data from multiple sources in a unified display, which presents operational data in a way that is easier to read and interpret by users. The single pane of glass view provides a unified digital experience to all users (e.g., roles) in the security management, such as, for example, a security compliance officer, a security compliance engineer, and the like. Thus, illustrative embodiments decrease multi-cloud operational risks by delivering real time or near real time data and insights for enhanced error remediation by illustrative embodiments automatically or by users.

Thus, illustrative embodiments provide one or more technical solutions that overcome a technical problem with providing error remediation of assets to support continuous operations in a multi-cloud environment. As a result, these one or more technical solutions provide a technical effect and practical application in the field of multi-clouds.

Figure 5:
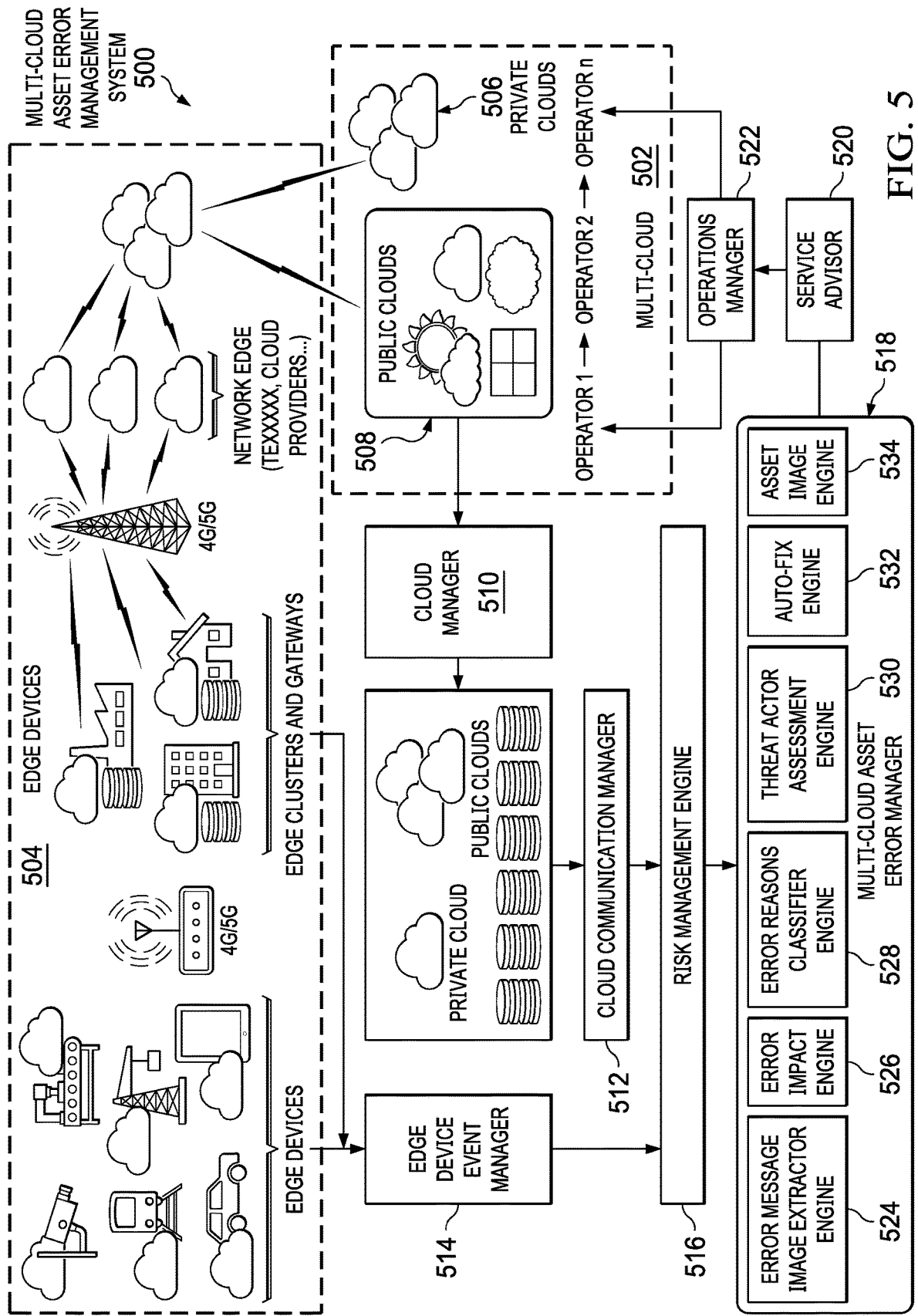
FIG. 5 is a diagram illustrating an example of a multi-cloud asset error management system in accordance with an illustrative embodiment.

With reference now to FIG. 5, a diagram illustrating an example of a multi-cloud asset error management system is depicted in accordance with an illustrative embodiment. Multi-cloud asset error management system 500 may be implemented in a network of data processing systems, such as network data processing system 100 in FIG. 1, or a cloud computing environment, such as cloud computing environment 300 in FIG. 3. Multi-cloud asset error management system 500 is a system of hardware and software components for managing multi-cloud asset error remediation to support continuous operations in a multi-cloud environment which can experience unplanned outages resulting in loss of business due to asset errors in the multi-cloud environment.

In this example, multi-cloud asset error management system 500 includes multi-cloud 502 and edge devices 504. Multi-cloud 502 may be implemented in network of data processing systems, such as, for example, network data processing system 100 in FIG. 1. Multi-cloud 502 includes private clouds 506 and public clouds 508. However, it should be noted that multi-cloud 502 is intended as an example only and may be comprised of any number and type of clouds. Edge devices 504 are connected to multi-cloud 502 via, for example, 4G/5G or the like, and may include, for example, mobile devices such as smart phones, smart glasses, smart watches, smart vehicles, virtual reality devices, handheld computers, laptop computers, and the like, IOT devices such as sensors, edge clusters and gateways, and the like. Edge devices 504 provide data processing capabilities for multi-cloud 502. In addition, the number and type of edge devices 504 change over time and may be expanded or contracted as needed by multi-cloud 502.

Multi-cloud asset error management system 500 also includes cloud manager 510, cloud communication manager 512, edge device event manager 514, risk management engine 516, multi-cloud asset error manager 518, service advisor 520, and operations manager 522. However, it should be noted that multi-cloud asset error management system 500 is intended as an example only and not as a limitation on illustrative embodiments. In other words, multi-cloud asset error management system 500 may include more or fewer components than shown. For example, one component may be divided into two or more components, two or more components may be combined into one component, components not shown may be added, one or more components shown may be removed, and the like.

Cloud manager 510 manages private clouds 506 and public clouds 508 in multi-cloud 502. Cloud communication manager 512 manages communications between private clouds 506 and public clouds 508 in multi-cloud 502. Edge device event manager 514 manages events (e.g., errors) corresponding to respective edge devices of edge devices 504.

Risk management engine 516 monitors and assess risk to edge devices 504 and assets of multi-cloud 502 based on security policies to ensure regulatory compliance and security governance. Risk management engine 516 also interprets and provides insights on security controls implementation across network, identity, data, audits, and the like.

Multi-cloud asset error manager 518 may be, for example, multi-cloud asset error manager 218 in FIG. 2. In this example, multi-cloud asset error manager 518 includes error message image extractor engine 524, error impact engine 526, error reasons classifier engine 528, threat actor assessment engine 530, auto-fix engine 532, and asset image engine 534. However, it should be noted that multi-cloud asset error manager 518 is intended as an example only and may include more or fewer components than shown.

Error message image extractor engine 524 extracts relevant text portions from images of error messages received from users. Error impact engine 526 interprets risk exposure and provides insights on potential impact on expected behavior of assets, such as, for example, applications and infrastructure of multi-cloud 502, deviating from actual design specifications. Error reasons classifier engine 528 matches asset errors to predefined reasons for the asset errors.

Threat actor assessment engine 530 provides security insights by detecting and analyzing suspicious behavior and threats of risk exposure of the assets, such as applications and infrastructure of multi-cloud 502. Auto-fix engine 532 provides predefined fixes for asset errors that match the predefined reasons for the asset errors. Asset image engine 534 analyzes images of defective assets by comparing the defective asset image with a reference image corresponding to the defective asset to localize the defect in the asset. Asset image engine 534 can provide insights to service owners and operations teams with priorities on all impacted assets that need to be fixed due to risk exposure using remediation techniques.

Service advisor 520 provides recommendations and insights into security management and governance of defective assets. Service advisor 520 can provide the recommendations and insights into the security management and governance of defective assets to, for example: a security or compliance officer who defines an enterprise policy framework based on risk, security, and compliance; a security or compliance engineer who performs security controls and compliance management (e.g., implements policy-based control, operations visibility, collects evidence, and acts on alerts and notifications); and service owners and operations teams to take action on informed alerts and notifications by the recommended remediation where user approval is required and follow up till the asset error is resolved. Operations manager 522 can automatically monitor and control operations of multi-cloud 502 based on input from multi-cloud asset error manager 518 and service advisor 520.

Figure 6:
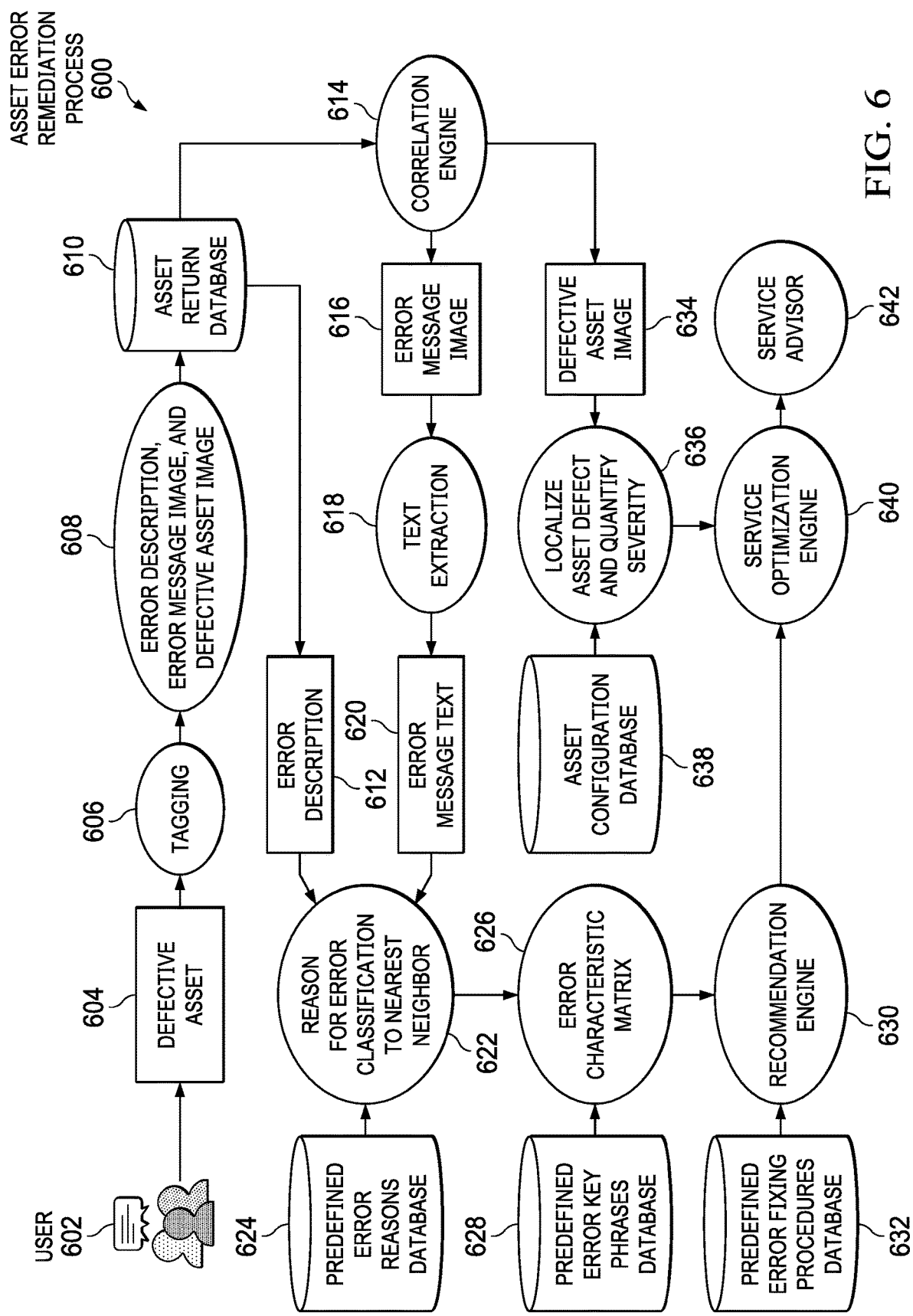
FIG. 6 is a diagram illustrating an example of an asset error remediation process in accordance with an illustrative embodiment.

With reference now to FIG. 6, a diagram illustrating an example of an asset error remediation process is depicted in accordance with an illustrative embodiment. Asset error remediation process 600 may be implemented in a multi-cloud asset error manager, such as, for example, multi-cloud asset error manager 518 in FIG. 5.

User 602 inputs, for example, an error description of defective asset 604 located in a multi-cloud environment, an image of an error message that was generated by defective asset 604, and an image of defective asset 604 into the multi-cloud asset error manager for processing and analysis. The multi-cloud environment may be, for example, multi-cloud 502 in FIG. 5. At 606, the multi-cloud asset error manager tags defective asset 604 so that the multi-cloud asset error manager can track defective asset 604 throughout the whole cycle of the remediation or return process. It should be noted that the multi-cloud asset error manager refers to the tag of defective asset 604 in subsequent steps.

At 608, the multi-cloud asset error manager analyzes the error description of defective asset 604, the image of the error message generated by defective asset 604, and the image of defective asset 604. Asset return database 610 records all assets after tagging and monitors status and updates corresponding to the assets of the multi-cloud environment.

The multi-cloud asset error manager utilizes asset error description 612 to determine reason for error classification to nearest neighbor 622 based on information stored in predefined error reasons database 624. In addition, the multi-cloud asset error manager utilizes correlation engine 614 to provide asset error message image 616 for text extraction at 618 to generate asset error message text 620 of asset error message image 616. The multi-cloud asset error manager also utilizes asset error message text 620 to determine reason for error classification to nearest neighbor 622 based on information stored in predefined error reasons database 624.

The multi-cloud asset error manager inputs reason for error classification to nearest neighbor 622 into error characteristic matrix 626, which also includes a set of predefined error key phrases corresponding to the asset error nearest neighbor that the multi-cloud asset error manager selected from predefined error key phrases database 628. The multi-cloud asset error manager inputs error characteristic matrix 626 into recommendation engine 630. Based on the information in error characteristic matrix 626, recommendation engine 630 selects a set of fix procedures for defective asset 604 from predefined error fixing procedures database 632. Recommendation engine 630 sends the set of fix procedures for defective asset 604 to service optimization engine 640. Service optimization engine 640 applies a set of agreed upon processes between the client and cloud service provider to generate a set of service optimization recommendations for increasing security, efficiency, productivity, and profitability of service delivery.

Further, the multi-cloud asset error manager utilizes correlation engine 614 to provide defective asset image 634 of defective asset 604 for asset defect localization and severity quantification at 636 based on information (e.g., reference image of the asset, asset configuration specification data, and the like) stored in asset configuration database 638. The multi-cloud asset error manager also inputs the asset defect localization and severity quantification data into service optimization engine 640.

Service optimization engine 640 inputs the set of service optimization recommendations to service advisor 642. Service advisor 642 may be, for example, service advisor 520 in FIG. 5. Based on the set of service optimization recommendations, service advisor 642 provides insights into security management and governance of defective asset 604.

Figure 7:
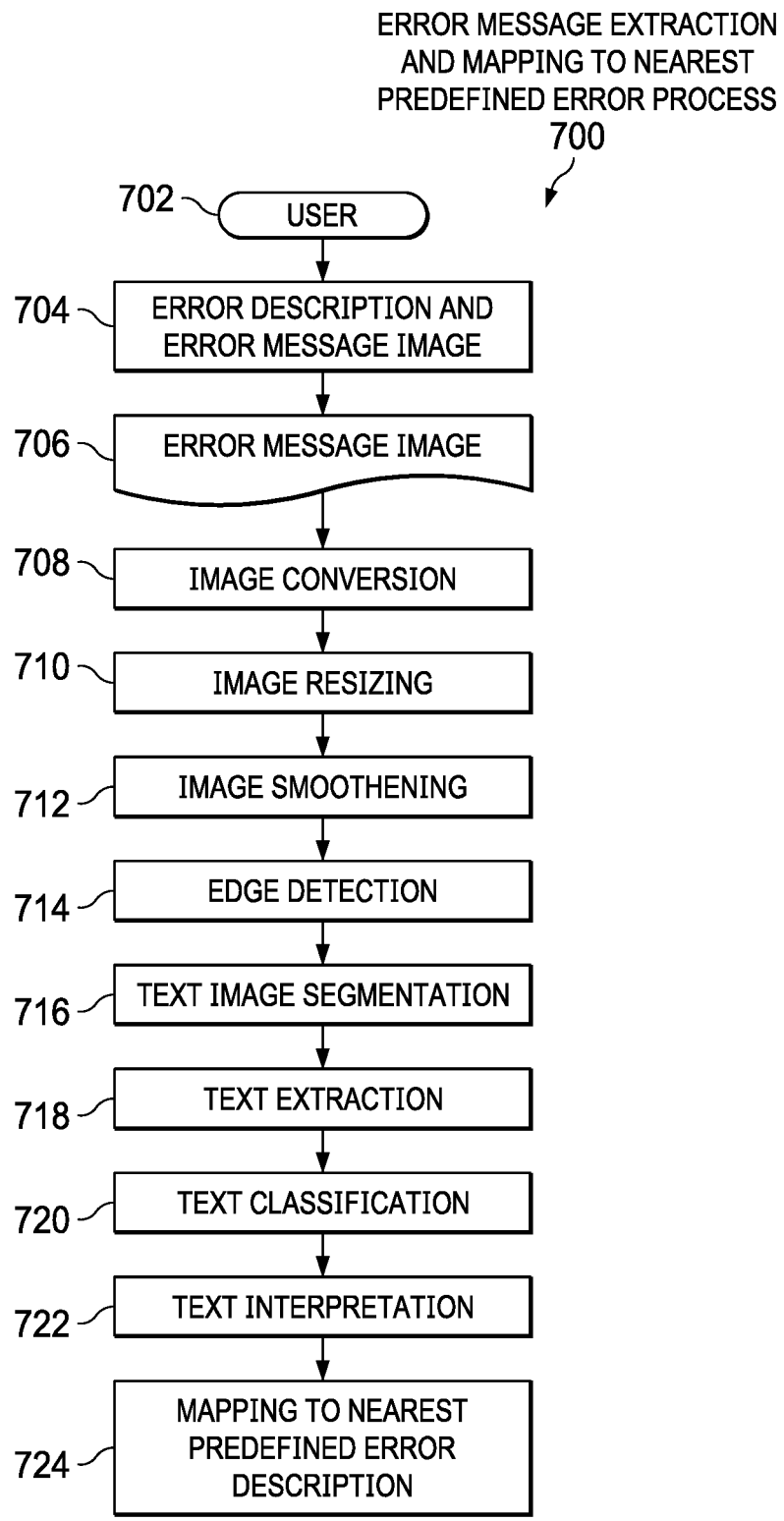
FIG. 7 is a diagram illustrating an example of an error message extraction and mapping to nearest predefined error process in accordance with an illustrative embodiment.

With reference now to FIG. 7, a diagram illustrating an example of an error message extraction and mapping to nearest predefined error process is depicted in accordance with an illustrative embodiment. Error message extraction and mapping to nearest predefined error process 700 may be implemented in a multi-cloud asset error manager, such as, for example, multi-cloud asset error manager 518 in FIG. 5.

User 702 inputs error description and error message image 704 corresponding to a defective asset, such as, for example, defective asset 604 in FIG. 6, into the multi-cloud asset error manager. At 706, the multi-cloud asset error manager processes the error message image using, for example, computer vision. At 708, the multi-cloud asset error manager performs image conversion. For example, the image of the error message (e.g., screenshot) captured and shared by user 702 can be of any format, such as, for example, jpeg, jpg, pn, or the like. However, because the multi-cloud asset error manager performs an automatic analysis, the multi-cloud asset error manager converts the image to a standardized format. At 710, the multi-cloud asset error manager also performs resizing of the image to a standardized size.

At 712, the multi-cloud asset error manager performs image smoothing. Image smoothing filters out the spurious noises from the image so that a better-quality image is made available for further processing. At 714, the multi-cloud asset error manager performs edge detection. Edge detection marks the contour or edge of the image. Edge detection is an intermediate step in the whole image processing cycle.

At 716, the multi-cloud asset error manager performs text image segmentation. Text image segmentation is generally needed considering that the image of the error message (e.g., screenshot) provided by user 702 may contain logos, graphics, symbols, and the like, which are not relevant. Relevant text corresponding to the asset error in the image is what is important to capture for further classification and interpretation. At 718, the multi-cloud asset error manager performs text extraction from the image of the error message.

At 720, the multi-cloud asset error manager performs text classification based on the relevant text extracted from the image of the error message. At 722, the multi-cloud asset error manager performs text interpretation using, for example, natural language processing. In other words, the multi-cloud asset error manager interprets the meaning of the extracted text. At 724, the multi-cloud asset error manager performs mapping of the extracted text corresponding to the asset error to the nearest predefined error description.

Figure 8:
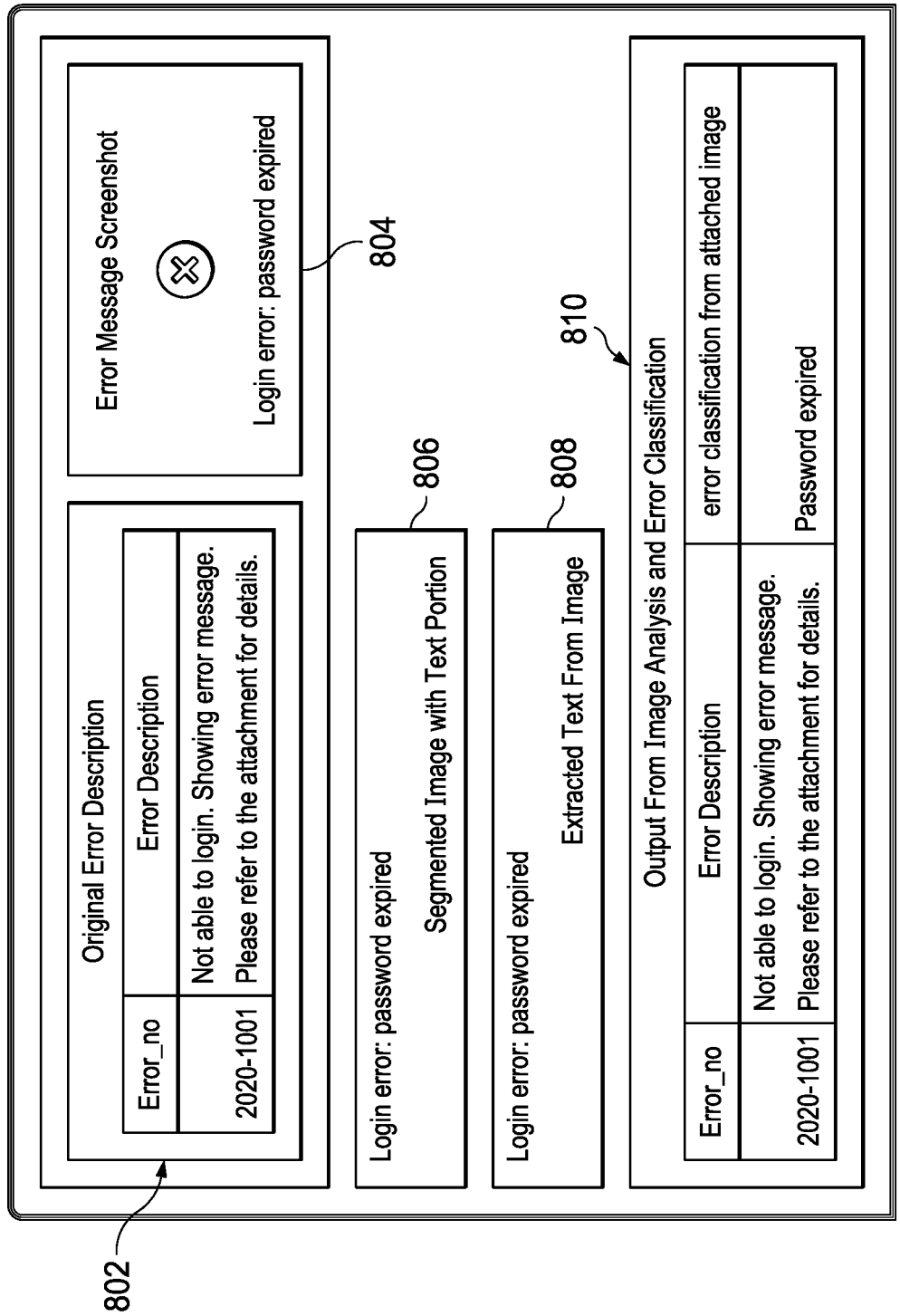
FIG. 8 is a diagram illustrating an example of an error message classification process in accordance with an illustrative embodiment.

With reference now to FIG. 8, a diagram illustrating an example of an error message classification process is depicted in accordance with an illustrative embodiment. Error message classification process 800 may be implemented in a multi-cloud asset error manager, such as, for example, multi-cloud asset error manager 518 in FIG. 5.

In this example, error message classification process 800 includes original error description 802 and error message screenshot 804. Original error description 802 includes an error number and an error description. In this specific example, the error description indicates that the user is not able to login, showing an error message, and requesting reference to the attachment for details. The attachment is error message screenshot 804 (i.e., image of the error message), which indicates "Login error: password expired".

At 806, the multi-cloud asset error manager segments error message screenshot 804 to identify the text portion "Login error: password expired" using, for example, computer vision. At 808, the multi-cloud asset error manager extracts the identified text portion "Login error: password expired" from error message screenshot 804. The multi-cloud asset error manager then classifies the extracted text as "password expired". At 810, the multi-cloud asset error manager adds the error classification to original error description 802.

Figure 9:
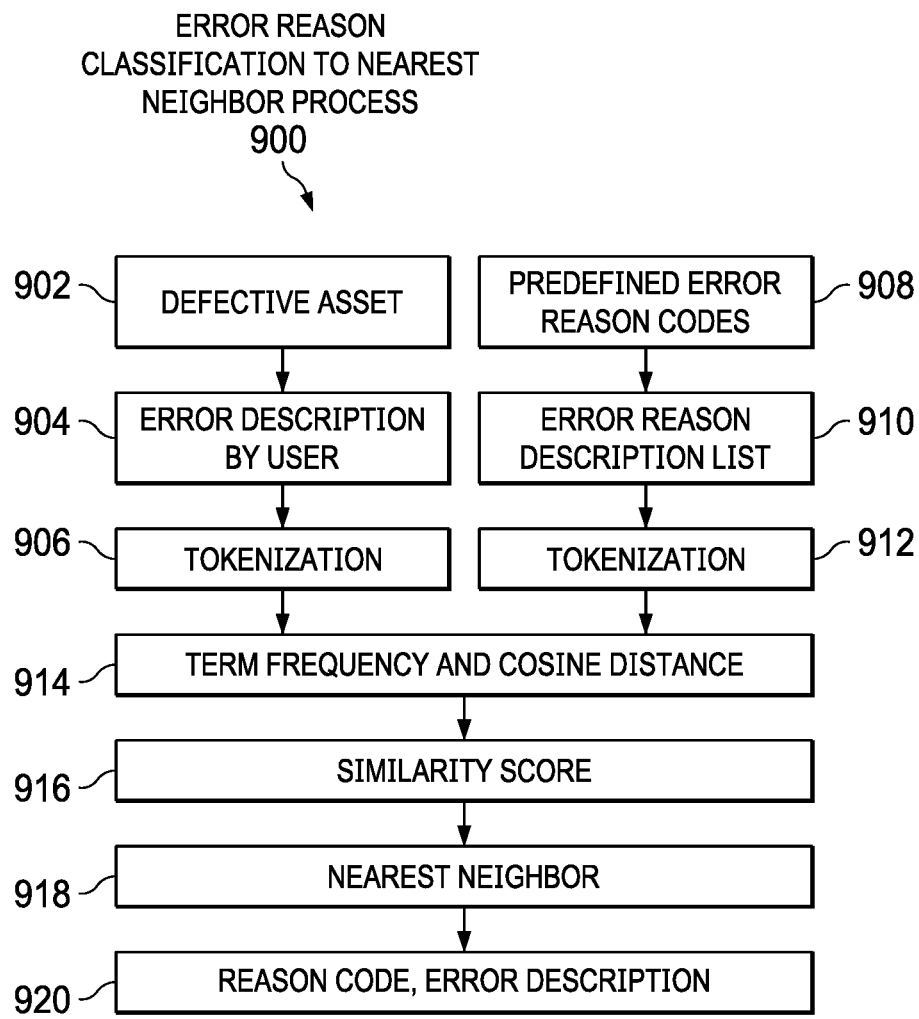
FIG. 9 is a diagram illustrating an example of an error reason classification to nearest neighbor process in accordance with an illustrative embodiment.

With reference now to FIG. 9, a diagram illustrating an example of an error reason classification to nearest neighbor process is depicted in accordance with an illustrative embodiment. Error reason classification to nearest neighbor process 900 may be implemented in a multi-cloud asset error manager, such as, for example, multi-cloud asset error manager 518 in FIG. 5.

At 902, the multi-cloud asset error manager receives identification of a defective asset from a user. At 904, the multi-cloud asset error manager receives a description of an error caused by the defective asset from the user. At 906, the multi-cloud asset error manager performs tokenization of the asset error description provided by the user using, for example, natural language processing. In other words, the multi-cloud asset error manager tokenizes the provided sentence to individual words.

At 908, the multi-cloud asset error manager selects predefined error reason codes based on the tokenized asset error description provided by the user. At 910, the multi-cloud asset error manager generates a list of predefined error reason descriptions based on the selected predefined error reason codes corresponding to the asset error description provided by the user. At 912, the multi-cloud asset error manager performs tokenization of the list of error reason descriptions.

At 914, the multi-cloud asset error manager determines term frequency and cosine distance to generate similarity scores 916 between the asset error description provided by the user and the predefined error reason descriptions. At 918, the multi-cloud asset error manager selects the predefined error reason description with the highest similarity score as the nearest neighbor to the asset error description provided by the user. At 920, the multi-cloud asset error manager outputs the predefined error reason code corresponding to the nearest neighbor predefined error reason description.

With reference now to FIG. 10, a diagram illustrating an example of an error reason classification process is depicted in accordance with an illustrative embodiment. Error reason classification process 1000 may be implemented in a multi-cloud asset error manager, such as, for example, multi-cloud asset error manager 518 in FIG. 5.

In this example, error reason classification process 1000 includes predefined error reason codes 1002, reported defective asset 1004, and similarity score matrix 1006. At 1008, based on the information contained in error reason codes 1002, reported defective asset 1004, and similarity score matrix 1006, the multi-cloud asset error manager determines that nearest predefined reason for the asset error, which in this specific example is 2 while logging in showing password expiry [asset error description] login failed due to password expiry [predefined error reason] 0.23207 [highest similarity score].

Figure 11:
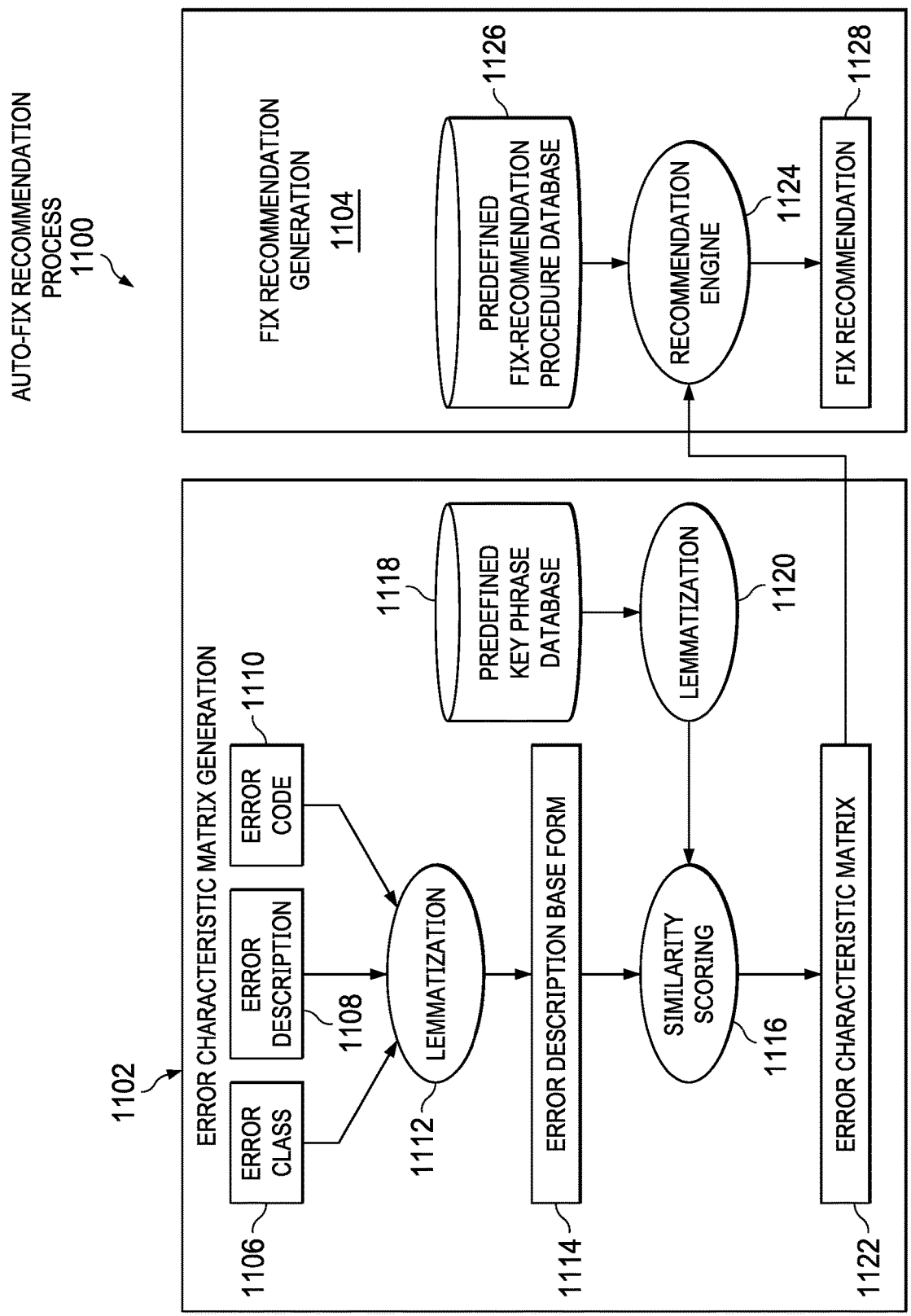
FIG. 11 is a diagram illustrating an example of an auto-fix recommendation process in accordance with an illustrative embodiment.

With reference now to FIG. 11, a diagram illustrating an example of an auto-fix recommendation process is depicted in accordance with an illustrative embodiment. Auto-fix recommendation process 1100 may be implemented in a multi-cloud asset error manager, such as, for example, multi-cloud asset error manager 518 in FIG. 5.

In this example, auto-fix recommendation process 1100 includes error characteristic matrix generation 1102 and fix recommendation generation 1104. During error characteristic matrix generation 1102, the multi-cloud asset error manager performs lemmatization 1112 of error classification 1106, error description 1108, and error code 1110. The multi-cloud asset error manager utilizes lemmatization 1112 of error classification 1106, error description 1108, and error code 1110 to generate error description base form 1114.

The multi-cloud asset error manager also performs lemmatization 1120 of a set of predefined key phrases, which correspond to error description base form 1114, that the multi-cloud asset error manager selected from predefined key phrase database 1118. At 1116, the multi-cloud asset error manager performs similarity scoring between error description base form 1114 and the set of predefined key phrases selected from predefined key phrase database 1118. The multi-cloud asset error manager generates error characteristic matrix 1122 and inputs error characteristic matrix 1122 into recommendation engine 1124. Recommendation engine 1124 generates fix recommendation 1228 for the asset error using a set of predefined fix recommendation procedures that recommendation engine 1124 selected from predefined fix recommendation procedure database 1126 based on the information contained in error characteristic matrix 1122.

Recommendation engine 1124 recommends asset error fixes based on predefined fix recommendation procedures available from the asset manufacturer. This is an evolving set of fix procedures from a history of asset returns and remediation actions taken in such instances. For each non-previously existing error category and fix pair, recommendation engine 1124 updates predefined fix recommendation procedure database 1126.

Figure 12:
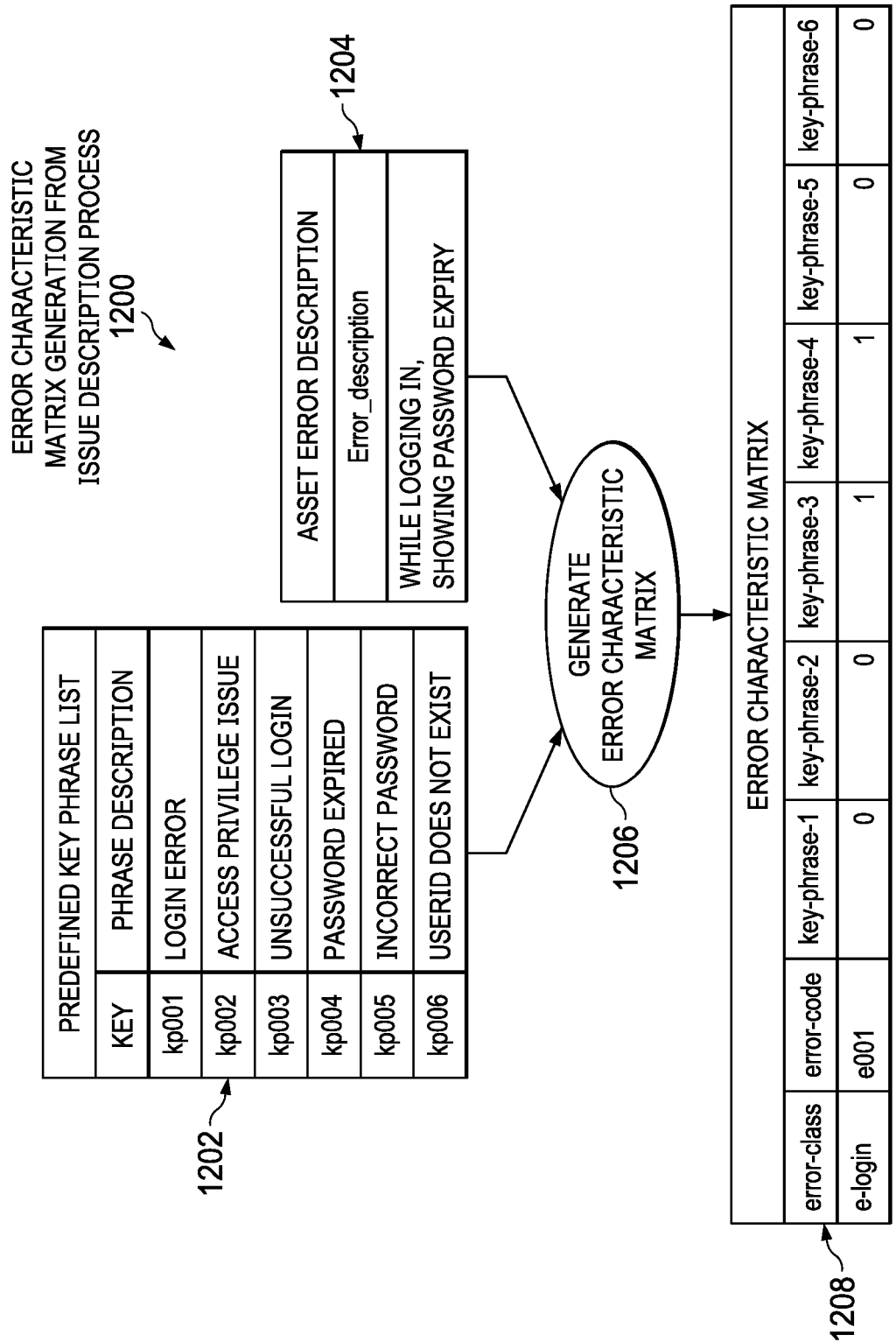
FIG. 12 is a diagram illustrating an example of an error characteristic matrix generation from error description process in accordance with an illustrative embodiment.

With reference now to FIG. 12, a diagram illustrating an example of an error characteristic matrix generation from error description process is depicted in accordance with an illustrative embodiment. Error characteristic matrix generation from error description process 1200 may be implemented in a multi-cloud asset error manager, such as, for example, multi-cloud asset error manager 518 in FIG. 5.

In this example, error characteristic matrix generation from error description process 1200 includes predefined key phase list 1202 and asset error description 1204. Predefined key phase list 1202 includes a key identifier for each respective key phrase description in the list. Asset error description 1204 includes a brief description of the asset error as provided by the user, which in this specific example is "While logging in, showing password expiry". At 1206, the multi-cloud asset error manager generates error characteristic matrix 1208. Error characteristic matrix 1208 includes error class, error code, and a set of key phrases corresponding to asset error description 1204. In this specific example, the error class is e-login, the error code is e001, and the set of key phrases are key phrase-3 [unsuccessful login] and key phrase-4 [password expired].

Figure 13:
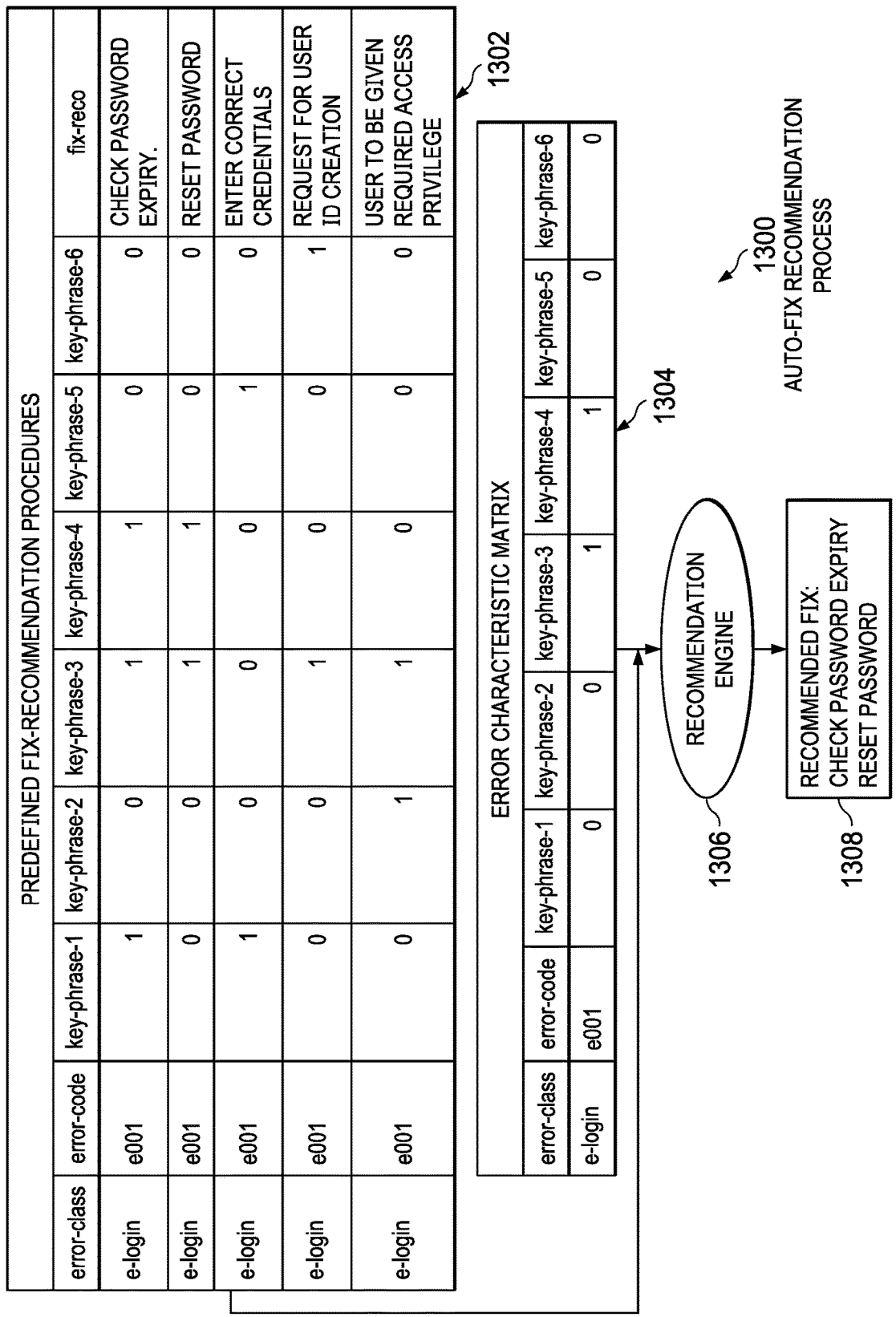
FIG. 13 is a diagram illustrating an example of an auto-fix recommendation process in accordance with an illustrative embodiment.

With reference now to FIG. 13, a diagram illustrating an example of an auto-fix recommendation process is depicted in accordance with an illustrative embodiment. Auto-fix recommendation process 1300 may be implemented in a multi-cloud asset error manager, such as, for example, multi-cloud asset error manager 518 in FIG. 5.

In this example, auto-fix recommendation process 1300 includes predefined fix-recommendation procedures 1302 and error characteristic matrix 1304, such as, for example, error characteristic matrix 1208 in FIG. 12. Predefined fix-recommendation procedures 1302 includes error class, error code, and a set of key phrases and a fix recommendation for each respective entry. The multi-cloud asset error manager inputs predefined fix-recommendation procedures 1302 and error characteristic matrix 1304 into recommendation engine 1306, such as, for example, recommendation engine 1124 in FIG. 11. Based on the information contained in predefined fix-recommendation procedures 1302 and error characteristic matrix 1304, recommendation engine 1306 generates recommended fix 1308, which in this specific example is "Check password expiry. Reset password".

Figure 14:
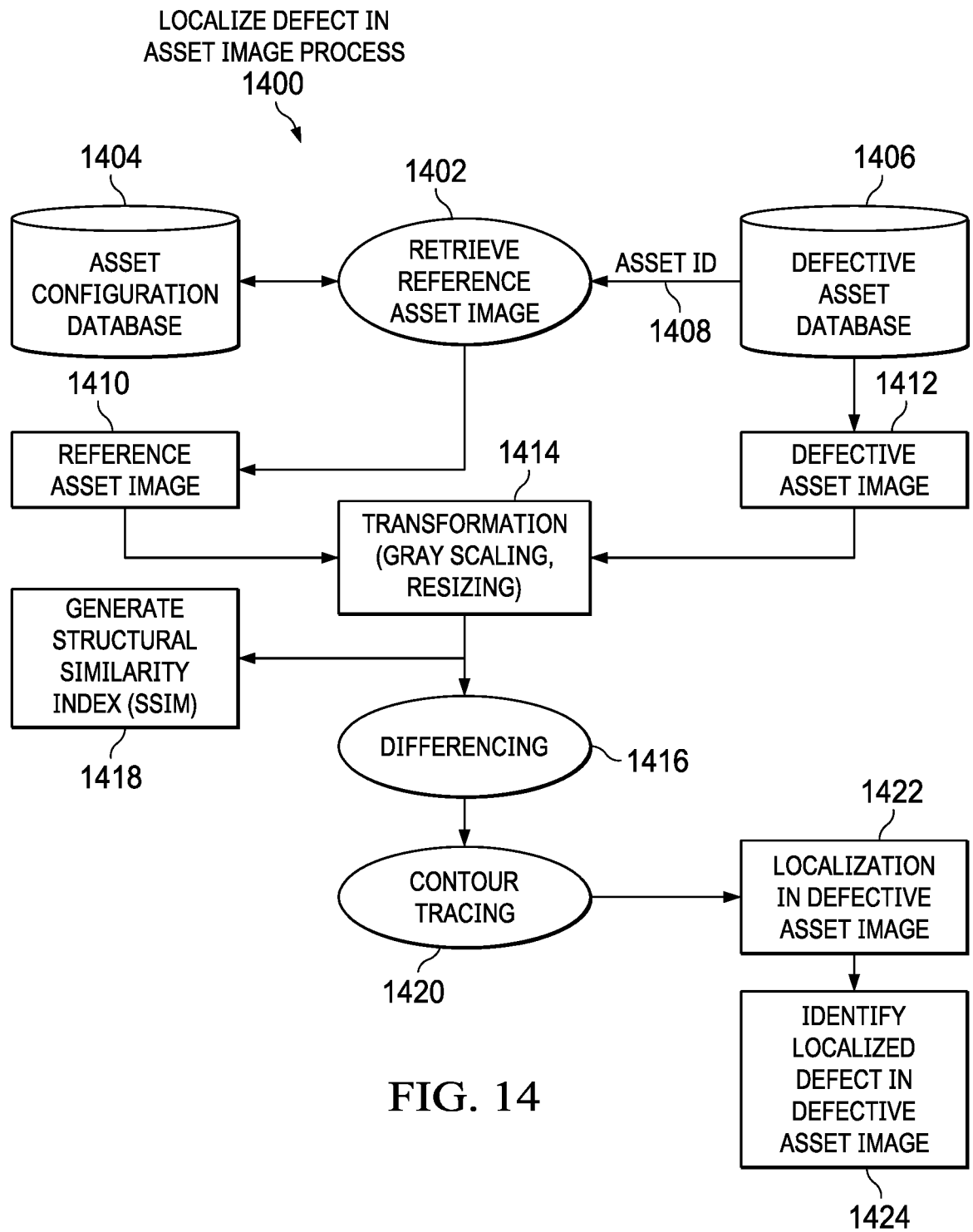
FIG. 14 is a diagram illustrating an example of a localize defect in asset image process in accordance with an illustrative embodiment.

With reference now to FIG. 14, a diagram illustrating an example of a localize defect in asset image process is depicted in accordance with an illustrative embodiment. Localize defect in asset image process 1400 may be implemented in a multi-cloud asset error manager, such as, for example, multi-cloud asset error manager 518 in FIG. 5.

At 1402, the multi-cloud asset error manager retrieves reference asset image 1410 from asset configuration database 1404 and retrieves defective asset image 1412 from defective asset database 1406 using asset identifier 1408. At 1414, the multi-cloud asset error manager performs transformation (e.g., image conversion, image resizing, image smoothing, and the like) of reference asset image 1410 and defective asset image 1412. At 1416, the multi-cloud asset error manager performs differencing between reference asset image 1410 and defective asset image 1412 using, for example, computer vision. Further, at 1418, the multi-cloud asset error manager generates a structural similarity index between reference asset image 1410 and defective asset image 1412 based on the differencing performed at 1416. Furthermore, at 1420, the multi-cloud asset error manager performs contour tracing of reference asset image 1410 and defective asset image 1412.

At 1422, based on the differencing, contour tracing, and structural similarity index, the multi-cloud asset error manager performs localization of the asset error in defective asset image 1412. At 1424, the multi-cloud asset error manager identifies the localized defect in defective asset image 1412 based on the localization.

Figure 15:
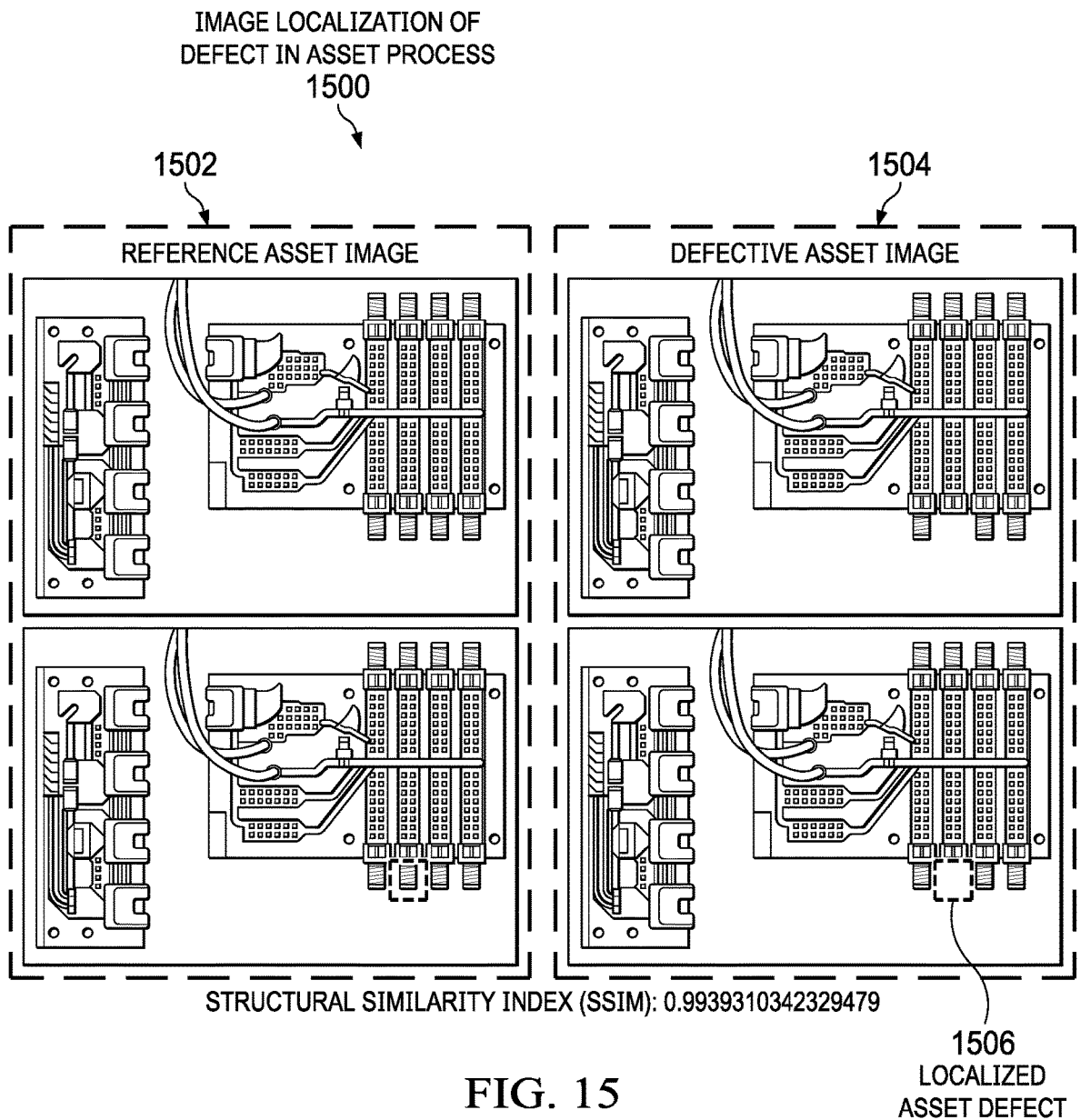
FIG. 15 is a diagram illustrating an example of an image localization of defect in asset process in accordance with an illustrative embodiment.

With reference now to FIG. 15, a diagram illustrating an example of an image localization of defect in asset process is depicted in accordance with an illustrative embodiment. Image localization of defect in asset process 1500 may be implemented in a multi-cloud asset error manager, such as, for example, multi-cloud asset error manager 518 in FIG. 5.

In this example, image localization of defect in asset process 1500 includes reference asset image 1502 and defective asset image 1504, such as, for example, reference asset image 1410 and defective asset image 1412 in FIG. 14. The multi-cloud asset error manager compares reference asset image 1502 and defective asset image 1504 using computer vision to perform differencing and contour tracing to identify localized asset defect 1506 in defective asset image 1504.

Figure 16:
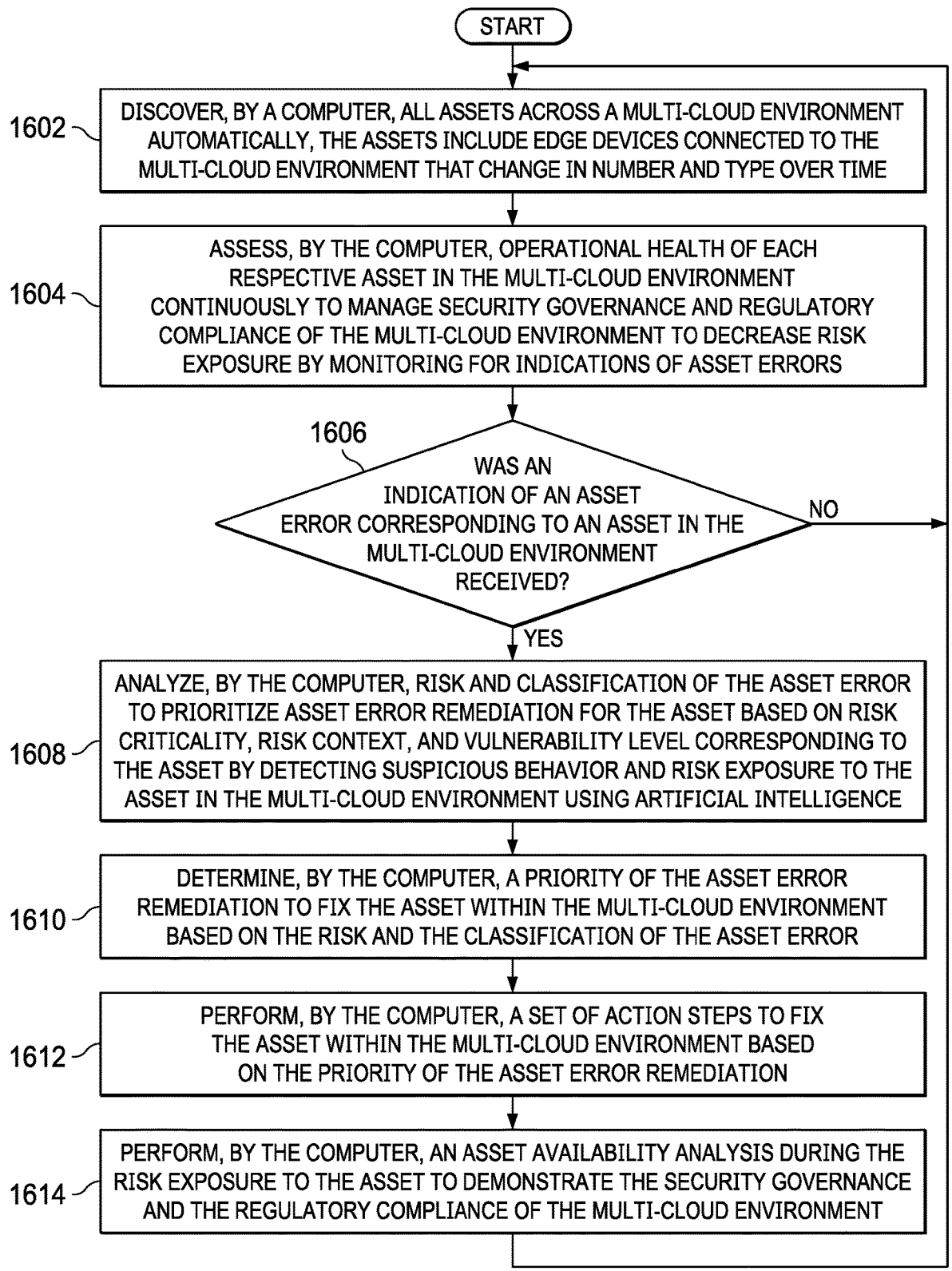
FIG. 16 is a flowchart illustrating a process for managing multi-cloud asset error remediation in accordance with an illustrative embodiment.

With reference now to FIG. 16, a flowchart illustrating a process for managing multi-cloud asset error remediation is shown in accordance with an illustrative embodiment. The process shown in FIG. 16 may be implemented in a computer, such as, for example, server 104 in FIG. 1, data processing system 200 in FIG. 2, or a cloud computing node of cloud computing nodes 310 in FIG. 3. For example, the process shown in FIG. 16 may be implemented in multi-cloud asset error manager 218 in FIG. 2.

The process begins when the computer discovers all assets across a multi-cloud environment automatically (step 1602). The assets include edge devices connected to the multi-cloud environment that change in number and type over time. The computer assesses operational health of each respective asset in the multi-cloud environment continuously to manage security governance and regulatory compliance of the multi-cloud environment to decrease risk exposure by monitoring for indications of asset errors (step 1604).

The computer makes a determination as to whether an indication of an asset error corresponding to an asset in the multi-cloud environment was received (step 1606). If the computer determines that no indication of an asset error corresponding to an asset in the multi-cloud environment was received, no output of step 1606, then the process returns to step 1602 where the computer continues to discover assets across the multi-cloud environment. If the computer determines that an indication of an asset error corresponding to an asset in the multi-cloud environment was received, yes output of step 1606, then the computer analyzes risk and classification of the asset error to prioritize asset error remediation for the asset based on risk criticality, risk context, and vulnerability level corresponding to the asset by detecting suspicious behavior and risk exposure to the asset in the multi-cloud environment using artificial intelligence (step 1608).

Afterward, the computer determines a priority of the asset error remediation to fix the asset within the multi-cloud environment based on the risk and the classification of the asset error (step 1610). In addition, the computer performs a set of action steps to fix the asset within the multi-cloud environment based on the priority of the asset error remediation (step 1612). Further, the computer performs an asset availability analysis during the risk exposure to the asset to demonstrate the security governance and the regulatory compliance of the multi-cloud environment (step 1614). Thereafter, the process returns to step 1602 where the computer continues to discover assets across the multi-cloud environment.

Thus, illustrative embodiments of the present invention provide a computer-implemented method, computer system, and computer program product for managing multi-cloud asset error remediation to support continuous operations management in a multi-cloud environment which can experience unplanned outages resulting in loss of business due to asset errors in the multi-cloud environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for asset error remediation, the computer-implemented method comprising:

analyzing, by a computer, risk and classification of an asset error to prioritize asset error remediation for an asset based on risk criticality, risk context, and vulnerability level corresponding to the asset by detecting suspicious behavior and risk exposure to the asset in a heterogeneous distributed computing environment using artificial intelligence, wherein the analyzing comprises:

retrieving, by the computer, a reference asset image and a defective asset image corresponding to the asset using an identifier of the asset;

performing, by the computer, differencing between the reference asset image and the defective asset image using computer vision;

performing, by the computer, contour tracing of the reference asset image and the defective asset image;

performing, by the computer, localization of the asset error in the defective asset image based on the differencing and the contour tracing; and identifying, by the computer, a localized defect in the asset in the defective asset image based on the localization;

determining, by the computer, a priority of the asset error remediation to fix the asset within the heterogeneous distributed computing environment based on the risk and the classification of the asset error; and performing, by the computer, a set of action steps to fix the asset within the heterogeneous distributed computing environment based on the priority of the asset error remediation.

2. The computer-implemented method of claim 1 further comprising:

performing, by the computer, an asset availability analysis during the risk exposure to the asset to demonstrate security governance and regulatory compliance of the heterogeneous distributed computing environment.

3. The computer-implemented method of claim 1 further comprising:

discovering, by the computer, assets across the heterogeneous distributed computing environment automatically, wherein the assets include edge devices connected to the heterogeneous distributed computing environment that change in number and type over time; and assessing, by the computer, operational health of each respective asset in the heterogeneous distributed computing environment continuously to manage security governance and regulatory compliance of the heterogeneous distributed computing environment to decrease risk exposure by monitoring for indications of asset errors.

4. The computer-implemented method of claim 1 further comprising:

receiving, by the computer, an image of an error message corresponding to the asset;

analyzing, by the computer, the image of the error message using computer vision;

segmenting, by the computer, the image of the error message to identify a relevant text portion corresponding to the asset error;

extracting, by the computer, the relevant text portion corresponding to the asset error from the image;

performing, by the computer, text classification of the relevant text portion corresponding to the asset error extracted from the image using natural language processing; and mapping, by the computer, the relevant text portion corresponding to the asset error to a nearest predefined error description.

5. The computer-implemented method of claim 1 further comprising:

receiving, by the computer, a description of the asset error from a user in a free text format;

processing, by the computer, the description of the asset error in the free text format using natural language processing;

calculating, by the computer, a similarity score between each predefined reason for error and the description of the asset error; and identifying, by the computer, a nearest predefined reason for error neighbor based on a particular predefined reason for error having a highest similarity score.

6. The computer-implemented method of claim 1 further comprising:

selecting, by the computer, a set of predefined key phrases corresponding to a description of the asset error;

performing, by the computer, similarity scoring between the description of the asset error and each of the set of predefined key phrases;

generating, by the computer, an error characteristic matrix for the asset error based on similarity scores of the set of predefined key phrases; and generating, by the computer, a set of predefined fix recommendation procedures based on information contained in the error characteristic matrix.

7. The computer-implemented method of claim 6 further comprising:

calculating, by the computer, a similarity score between each respective predefined key phrase in the set of predefined key phrases and each respective fix in the set of predefined fix recommendation procedures;

identifying, by the computer, a fix having a highest similarity score; and using, by the computer, the fix having the highest similarity score to correct the asset error.

8. The computer-implemented method of claim 1, wherein the heterogeneous distributed computing environment is a multi-cloud environment comprised of a plurality of clouds corresponding to different cloud providers and a plurality of edge devices.

9. A computer system for asset error remediation, the computer system comprising:

a bus system;

a storage device connected to the bus system, wherein the storage device stores program instructions; and a processor connected to the bus system, wherein the processor executes the program instructions to:

analyze risk and classification of an asset error to prioritize asset error remediation for an asset based on risk criticality, risk context, and vulnerability level corresponding to the asset by detecting suspicious behavior and risk exposure to the asset in a heterogeneous distributed computing environment using artificial intelligence, wherein the processor further executes the program instructions to:

retrieve a reference asset image and a defective asset image corresponding to the asset using an identifier of the asset;

perform differencing between the reference asset image and the defective asset image using computer vision;

perform contour tracing of the reference asset image and the defective asset image;

perform localization of the asset error in the defective asset image based on the differencing and the contour tracing; and identify a localized defect in the asset in the defective asset image based on the localization;

determine a priority of the asset error remediation to fix the asset within the heterogeneous distributed computing environment based on the risk and the classification of the asset error; and perform a set of action steps to fix the asset within the heterogeneous distributed computing environment based on the priority of the asset error remediation.

10. The computer system of claim 9, wherein the processor further executes the program instructions to:

perform an asset availability analysis during the risk exposure to the asset to demonstrate security governance and regulatory compliance of the heterogeneous distributed computing environment.

11. The computer system of claim 9, wherein the processor further executes the program instructions to:
discover assets across the heterogeneous distributed computing environment automatically, wherein the assets include edge devices connected to the heterogeneous distributed computing environment that change in number and type over time; and
assess operational health of each respective asset in the heterogeneous distributed computing environment continuously to manage security governance and regulatory compliance of the heterogeneous distributed computing environment to decrease risk exposure by monitoring for indications of asset errors.

12. A computer program product for asset error remediation, the computer program product comprising a computer-readable storage medium having program instructions embodied therewith, the program instructions executable by a computer to cause the computer to perform a method of:
analyzing, by the computer, risk and classification of an asset error to prioritize asset error remediation for an asset based on risk criticality, risk context, and vulnerability level corresponding to the asset by detecting suspicious behavior and risk exposure to the asset in a heterogeneous distributed computing environment using artificial intelligence, wherein the analyzing comprises:
retrieving, by the computer, a reference asset image and a defective asset image corresponding to the asset using an identifier of the asset;
performing, by the computer, differencing between the reference asset image and the defective asset image using computer vision;
performing, by the computer, contour tracing of the reference asset image and the defective asset image;
performing, by the computer, localization of the asset error in the defective asset image based on the differencing and the contour tracing; and
identifying, by the computer, a localized defect in the asset in the defective asset image based on the localization;
determining, by the computer, a priority of the asset error remediation to fix the asset within the heterogeneous distributed computing environment based on the risk and the classification of the asset error; and
performing, by the computer, a set of action steps to fix the asset within the heterogeneous distributed computing environment based on the priority of the asset error remediation.

13. The computer program product of claim 12 further comprising:
performing, by the computer, an asset availability analysis during the risk exposure to the asset to demonstrate security governance and regulatory compliance of the heterogeneous distributed computing environment.

14. The computer program product of claim 12 further comprising:
discovering, by the computer, assets across the heterogeneous distributed computing environment automatically, wherein the assets include edge devices connected to the heterogeneous distributed computing environment that change in number and type over time; and assessing, by the computer, operational health of each respective asset in the heterogeneous distributed computing environment continuously to manage security governance and regulatory compliance of the heterogeneous distributed computing environment to decrease risk exposure by monitoring for indications of asset errors.

15. The computer program product of claim 12 further comprising:
receiving, by the computer, an image of an error message corresponding to the asset;
analyzing, by the computer, the image of the error message using computer vision;
segmenting, by the computer, the image of the error message to identify a relevant text portion corresponding to the asset error;
extracting, by the computer, the relevant text portion corresponding to the asset error from the image;
performing, by the computer, text classification of the relevant text portion corresponding to the asset error extracted from the image using natural language processing; and
mapping, by the computer, the relevant text portion corresponding to the asset error to a nearest predefined error description.

16. The computer program product of claim 12 further comprising:
receiving, by the computer, a description of the asset error from a user in a free text format;
processing, by the computer, the description of the asset error in the free text format using natural language processing;
calculating, by the computer, a similarity score between each predefined reason for error and the description of the asset error; and
identifying, by the computer, a nearest predefined reason for error neighbor based on a particular predefined reason for error having a highest similarity score.

17. The computer program product of claim 12 further comprising:
selecting, by the computer, a set of predefined key phrases corresponding to a description of the asset error;
performing, by the computer, similarity scoring between the description of the asset error and each of the set of predefined key phrases;
generating, by the computer, an error characteristic matrix for the asset error based on similarity scores of the set of predefined key phrases; and
generating, by the computer, a set of predefined fix recommendation procedures based on information contained in the error characteristic matrix.

18. The computer program product of claim 17 further comprising:
calculating, by the computer, a similarity score between each respective predefined key phrase in the set of predefined key phrases and each respective fix in the set of predefined fix recommendation procedures;
identifying, by the computer, a fix having a highest similarity score; and
using, by the computer, the fix having the highest similarity score to correct the asset error.

* * * * *